US012652553B2

(12) United States Patent
Chen et al.

(10) Patent No.: US 12,652,553 B2
(45) Date of Patent: Jun. 9, 2026

(54) QOS-AWARE SERVICE MIGRATION METHOD FOR IOV SYSTEM BASED ON CVX DEEP REINFORCEMENT LEARNING

(71) Applicant: FUZHOU UNIVERSITY, Fuzhou (CN)

(72) Inventors: Zheyi Chen, Fuzhou (CN); Sijin Huang, Fuzhou (CN); Jia Wen, Fuzhou (CN); Qingnan Jiang, Fuzhou (CN)

(73) Assignee: FUZHOU UNIVERSITY, Fuzhou (CN)

( * ) Notice: Subject to any disclaimer, the term of this patent is extended or adjusted under 35 U.S.C. 154(b) by 355 days.

(21) Appl. No.: 18/399,704

(22) Filed: Dec. 29, 2023

(65) Prior Publication Data

US 2025/0168732 A1     May 22, 2025

Related U.S. Application Data

(63) Continuation of application No. PCT/CN2023/132767, filed on Nov. 21, 2023.

(51) Int. Cl.
*G06N 3/084* (2023.01)
*G06N 3/092* (2023.01)
(Continued)

(52) U.S. Cl.
CPC ............ *H04W 24/02* (2013.01); *G06N 3/084* (2013.01); *G06N 3/092* (2023.01); *H04L 41/142* (2013.01);
(Continued)

(58) Field of Classification Search
CPC .... G06F 9/50–5094; G06N 3/08–0985; G06N 20/10–20; H04B 17/0082–3913; H04L 41/14–40; H04L 43/02–55; H04W 4/30–80; H04W 8/18–245; H04W 16/18–225; H04W 24/02–10; H04W 28/02–26; H04W 36/0005–385; H04W 60/005–06; H04W 72/02–569;
(Continued)

(56) References Cited

U.S. PATENT DOCUMENTS

| | | | | |
|---|---|---|---|---|
| 2020/0320397 | A1* | 10/2020 | Liu | ......................... G06N 3/092 |
| 2025/0165311 | A1* | 5/2025 | Liu | ......................... G06F 9/5094 |

* cited by examiner

*Primary Examiner* — Timothy J Weidner

(74) *Attorney, Agent, or Firm* — Bayramoglu Law Offices LLC

(57) ABSTRACT

A QoS-aware service migration method in an IoV system based on CVX deep reinforcement learning is provided. Firstly, the optimization problem of service migration and resource allocation is decoupled into two sub-problems; then, a new actor-critic-based asynchronous-update deep reinforcement learning method is designed to explore the optimal service migration, where a delayed-update actor makes decisions of service migration and a one-step-update critic evaluates the decisions to guide the direction of the policy update; and on this basis, an optimal resource allocation method for an MEC server based on convex optimization is proposed to achieve the optimal resource allocation. According to the QoS-aware service migration method, extensive experiments are conducted based on a real-world testbed and a dataset of city vehicle trajectories, thereby verifying the feasibility and effectiveness of SeMiR. Compared with benchmark methods, the SeMiR has the best performance of service migration under various scenarios.

6 Claims, 8 Drawing Sheets

(51) Int. Cl.

| | |
|---|---|
| *H04L 41/142* | (2022.01) |
| *H04L 41/16* | (2022.01) |
| *H04W 4/44* | (2018.01) |
| *H04W 4/50* | (2018.01) |
| *H04W 16/18* | (2009.01) |
| *H04W 16/22* | (2009.01) |
| *H04W 24/02* | (2009.01) |
| *H04W 24/04* | (2009.01) |
| *H04W 28/02* | (2009.01) |
| *H04W 28/08* | (2023.01) |
| *H04W 36/30* | (2009.01) |
| *H04W 36/32* | (2009.01) |
| *H04W 72/04* | (2023.01) |
| *H04W 72/52* | (2023.01) |
| *H04W 84/02* | (2009.01) |
| *H04W 88/08* | (2009.01) |
| *H04W 88/12* | (2009.01) |
| *H04W 88/18* | (2009.01) |
| *H04W 92/02* | (2009.01) |
| *H04W 92/12* | (2009.01) |

(52) U.S. Cl.
CPC ............... *H04L 41/16* (2013.01); *H04W 4/44* (2018.02); *H04W 4/50* (2018.02); *H04W 16/18* (2013.01); *H04W 16/22* (2013.01); *H04W 24/04* (2013.01); *H04W 28/0268* (2013.01); *H04W 28/0967* (2020.05); *H04W 36/30* (2013.01); *H04W 36/322* (2023.05); *H04W 72/04* (2013.01); *H04W 72/52* (2023.01); *H04W 84/02* (2013.01); *H04W 88/08* (2013.01); *H04W 88/12* (2013.01); *H04W 88/18* (2013.01); *H04W 92/02* (2013.01); *H04W 92/12* (2013.01)

(58) Field of Classification Search
CPC ........... H04W 84/005–22; H04W 88/005–188; H04W 92/02–24
See application file for complete search history.

(b) Convergence on migration frequency (a) Convergence on reward

QOS-AWARE SERVICE MIGRATION METHOD FOR IOV SYSTEM BASED ON CVX DEEP REINFORCEMENT LEARNING

CROSS REFERENCE TO THE RELATED APPLICATIONS

This application is the continuation application of International Application No. PCT/CN2023/132767, filed on Nov. 21, 2023, the entire contents of which are incorporated herein by reference.

TECHNICAL FIELD

The present invention relates to a QoS-aware service migration method for an Internet-of-Vehicles (IoV) system based on CVX deep reinforcement learning.

BACKGROUND

With the fast development of 5G techniques, IoV has become a part of smart cities. Equipped with intelligent sensing devices, vehicles can host various IoV applications such as automatic driving, image recognition and path planning. However, the real-time demands of IoV applications lead to great challenges for onboard processors with limited computational capabilities. Although vehicles can offload their applications' tasks to remote cloud through nearby base stations (BS), the long distance of data transmission results in excessive delay, contradicting the real-time demands of the IoV applications. To relieve the problem, the emerging mobile edge computing (MEC) offers low-latency and high-bandwidth services by deploying computational and storage resources at the network edge. Therefore, vehicles can offload their applications' tasks to nearby MEC servers for processing, thereby alleviating the congestion problem in a core network and reducing a task response delay. In an MEC-based IoV system, virtualization is deemed as a key technique for conducting resource management. When a vehicle offloads the tasks, the MEC server will create a dedicate service instance for the vehicle through a virtualization technique and allocate proper resources thereto. Service instances integrate data in the running process and user context information, thereby providing fine computing services for vehicles while ensuring resource isolation.

Due to the high vehicle mobility and the finite communication coverage of the base station, it is difficult for an MEC server to provide uninterrupted services to a vehicle, seriously degrading the Quality-of-Service (QoS). To guarantee high QoS, the service instances created by the MEC server will be migrated along with the movement of the vehicle. The performance of service migration depends on multiple factors, including a vehicle location, a task size and an available MEC resource. An improper migration policy may cause an excessive task response delay and seriously reduce the QoS. Commonly, the process of service migration in the MEC-based IoV system may be regarded as a long-term sequential decision problem. A current migration decision may affect the future system performance, so it is challenging to optimize the long-term performance without foreknowing the potential mobility of vehicles. In addition, the migration decisions of different vehicles have mutual influence, so it is extremely hard to simultaneously optimize the service migration of all vehicles with the concern of minimizing system delays.

Following migration decisions, the service instance of the vehicle is migrated to a target MEC server for processing tasks. Compared with remote cloud, the MEC server owns a limited computational resource, and the continuous influx of tasks commonly imposes various resource demands. Therefore, in a case that the resources of the MEC server are limited, it is necessary to allocate proper resources to service instances thereon. Most of the existing studies do not well consider the optimizing resource allocation when processing the service migration, thereby seriously hindering the improvement of the system performance. Few studies investigate the joint optimization problem of service migration and resource allocation, which is regarded as a mixed integer nonlinear programming problem. These studies typically adopt classic optimization theories, which usually increases the cost due to numerous iterations. Meanwhile, in the complex and dynamic MEC-based IoV system, the future vehicle mobility is not considered well, so it is easy to fall into a local optimum. For this problem, an emerging deep reinforcement learning (DRL) is deemed as a promising method. Through interactive learning with the environment, a DRL agent may gradually adjust a policy to maximize a long-term cumulative reward. However, most of the existing studies adopt the value-based DRL, and the method learns a deterministic policy by comparing the Q-values of all candidate actions. The huge decision-making space on the MEC-based IoV system may result in low learning efficiency and even training failure of this method. By comparison, the policy-based DRL may handle the huge space by directly outputting the probability distribution of actions, but high variance may happen when a policy gradient is estimated.

SUMMARY

An objective of the present invention is to provide a QoS-aware service migration method in an IoV system based on CVX deep reinforcement learning in view of the defects in the background art, that is, SeMiR, compared with benchmark methods, the SeMiR of the present invention has the best performance of service migration under various scenarios.

To achieve the above objective, the technical solution of the present invention is: a QoS-aware service migration method in an IoV system based on CVX deep reinforcement learning includes: firstly, decoupling the optimization problem of service migration and resource allocation into two sub-problems; then, designing a new actor-critic-based asynchronous-update deep reinforcement learning method to explore the optimal service migration, where a delayed-update actor makes decisions of service migration and a one-step-update critic evaluates the decisions to guide the direction of the strategy update; and on this basis, proposing an optimal resource allocation method for an MEC server based on convex optimization to achieve the optimal resource allocation.

In one embodiment of the present invention, the decoupling the optimization problem of service migration and resource allocation into two sub-problems is specifically as follows: for a complex and dynamic MEC-based IoV system, designing a unified service migration and resource allocation model; firstly, setting a long-term QoS as an optimization objective, where Qos includes a migration delay, a communication delay and a computation delay, involving two subproblems of solving a service migration and a resource allocation; and then, respectively decoupling and expressing the two sub-problems of service migration and resource allocation.

In one embodiment of the present invention, the proposing an optimal resource allocation method for an MEC server based on convex optimization to achieve the optimal resource allocation is as follows: firstly, proving that the resource allocation sub-problem is a convex programming problem through a Hessian matrix with constraint conditions; then, based on a convex optimization theory, defining a generalized Lagrange function and a Karush-Kuhn-Tucker (KKT) condition of the resource allocation sub-problem; and finally, deriving an optimal resource allocation of each MEC server under a given migration decision.

In one embodiment of the present invention, the decoupling the optimization problem of service migration and resource allocation into two sub-problems is implemented specifically as follows:

the MEC-based service migration system is composed of an MEC controller, M base stations (BS) and U intelligent vehicles (IV); each BS is equipped with an MEC server, named edge node; a set of edge nodes is expressed as $M=\{1, 2, \ldots, m, \ldots, M\}$, and a set of IVs is expressed as $U=\{1, 2, \ldots, u, \ldots, U\}$; $IV_u$ sends a task to a service instance corresponding thereto in a 5G network, and the BS forwards the task to the MEC server where the service instance is located; the MEC server processes the task and returns the result; the MEC controller gathers and transmits information to a DRL agent, and the DRL agent generates decisions of service migration for the IV;

the system runs in discrete time slots, and a location of $IV_u$ may change at the beginning of each time slot t, $t \in \{0, 1, 2, \ldots, T\}$; meanwhile, an intelligent application on $IV_u$ generates a computation-intensive task at each time slot, denoted as $Task_t(u)$, and these tasks are continuously offloaded to the MEC server for processing; at the first time slot, $IV_u$ accesses the system through the nearest BS and creates a service instance on the corresponding MEC server; at the time slot t, an edge node connected to $IV_u$ is denoted as $$M_t^l(u) \in M,$$

and an edge node where the service instance of $IV_u$ is located is denoted as $$M_t^s(u) \in M;$$

the edge nodes are interconnected through a stable backhaul link; in a case that $IV_u$ is disconnected from $$M_t^s(u),$$

the task thereon is still transmitted to $$M_t^s(u)$$

by the backhaul link;

A. Migration Model $$M_{t-1}^s(u) \in M$$

is defined as an edge node where the service instance of $IV_u$ is located at the time slot $t-1$, $\rho_t(u) \in M$ is defined as a migration decision of $IV_u$ at the time slot t, $$M_t^s(u)$$

being determined by $\rho_t(u)$; in addition, a hop distance between $$M_{t-1}^s(u)$$

and $$M_t^s(u)$$

is measured by $\delta_t(u)$; in a case that $$M_{t-1}^s(u) = M_t^s(u), \delta_t(u) = 0,$$

no service migration happens at the current time slot; otherwise, the service instance of $IV_u$ is migrated from $$M_{t-1}^s(u) \text{ to } M_t^s(u),$$

and in this period, a migration delay occurs, the migration delay being a monotonic non-decreasing function of $\delta_t(u)$ and expressed as $$MT_t(u) = \begin{cases} 0, & \delta_t(u) = 0 \\ \dfrac{S_t(u)}{x} + \mu^m \delta_t(u), & \delta_t(u) \neq 0 \end{cases}$$

where $S_t(u)$ is service data of $IV_u$, x is a network bandwidth of the backhaul link, and $u^m$ is a unit migration delay coefficient that indicates the migration delay per hop;

B. Communication Model

After service migration, $IV_u$ offloads $Task_t(u)$ to a service instance on $$M_t^s(u)$$

for processing, and in this period, a communication delay is generated and includes a data transmission delay between $IV_u$ and $$M_t^i(u)$$

and a transmission delay of the backhaul link between $$M_t^i(u) \text{ and } M_t^s(u);$$

a signal-to-noise ratio (SNR) between $\text{IV}_u$ and $$M_t^i(u)$$

is expressed as:

$$SNR\big(u, M_t^i(u)\big) = \frac{P_u G\big(u, M_t^i(u)\big)}{\sigma^2}$$

where $P_u$ is a transmission power of $\text{IV}_u$, $\sigma^2$ is Gaussian noise, $$G\big(u, M_t^i(u)\big)$$

is a channel gain between $\text{IV}_u$ and $$M_t^i(u)$$

and is expressed as $$G\big(u, M_t^i(u)\big) = \frac{\alpha}{\left|Len\big(u, M_t^i(u)\big)\right|^2}$$

where $$Len\big(u, M_t^i(u)\big)$$

is a distance between $\text{IV}_u$ and $$M_t^i(u),$$

and $\alpha$ is a channel gain per unit distance;
a total bandwidth of the BS is denoted as B, B is equally allocated to vehicles at each time slot based on orthogonal frequency division multiplexing (OFDM), and a wireless uplink rate of $\text{IV}_u$ is defined as $$R_t(u) = B_t(u) \log\big(1 + SNR\big(u, M_t^i(u)\big)\big)$$

where $B_t$ is an available bandwidth of $\text{IV}_u$;

then the data transmission delay of $\text{IV}_u$ is defined as $$PT_t(u) = \frac{D_t(u)}{R_t(u)}$$

where $D_t(u)$ is a data volume of $\text{Task}_t(u)$;
in a case that $$M_t^i(u) \neq M_t^s(u),$$

$\text{Task}_t(u)$ will be transmitted on the backhaul link; the transmission delay of the backhaul link depends on $D_t(u)$ and a hop distance between $$M_t^i(u) \text{ and } M_t^s(u);$$

the hop distance is measured by $$\phi_t^{ls}(u),$$

and the transmission delay of the backhaul link is expressed as $$ST_t(u) = \begin{cases} 0, & \phi_t^{ls}(u) = 0 \\ \dfrac{D_t(u)}{x} + \mu^h \phi_t^{ls}(u), & \phi_t^{ls}(u) \neq 0 \end{cases}$$

where $\mu^h$ is a unit transmission delay coefficient that indicates a transmission delay per hop;
therefore, the communication delay is expressed as $$HT_t(u) = PT_t(u) + ST_t(u).$$

C. Computation Model
When $\text{Task}_t(u)$ is offloaded to $$M_t^s(u),$$

the MEC server will allocate a computational resource to the service instance to process the task; a CPU cycle required to process $\text{Task}_t(u)$ is defined as $$K_t(u) = D_t(u)C_t(u)$$

where $C_t(u)$ is a computational density of $\text{Task}_t(u)$ and indicates the CPU cycle for processing one-bit task data;
the maximum computational capability of the MEC server, that is, a CPU frequency, is denoted as F; therefore, the computation delay is expressed as:

$$CT_t(u) = \frac{K_t(u)}{\xi_t(u)F}$$

where $\xi_t(u)$ indicates the proportion of the computational resources allocated to the service instance of $IV_u$;

D. Optimization Objective

Within T time slots, the objective is to minimize the long-term delay of the MEC-based IoV system, including a migration delay, a communication delay and a computation delay, that is, to solve the optimization problem of service migration and resource allocation:

$$P1: \min_{\rho_t(u),\xi_t(u)} \sum_{t=0}^{T} \sum_{u=1}^{U} (MT_t(u) + HT_t(u) + CT_t(u))$$

$$\text{s.t. } C1: \rho_t(u) \in \mathcal{M}, t \in T, u \in \mathcal{U},$$

$$C2: \xi_t(u) \in [0, 1], t \in T, u \in \mathcal{U},$$

$$C3: \sum_{u \in \mathcal{U}_m} \xi_t(u) \le 1, t \in T, m \in \mathcal{M},$$

where IVs that migrate the service instances to the edge node m are expressed as a set $U_m$, C1 indicates a constraint of a migration decision, C2 indicates a constraint of a resource proportion allocated to the service instance, and C3 indicates a constraint of a proportion sum of C2;

a total computational resource of the MEC server is denoted as $F_{ALL}$, and a total delay is defined as $AT_t(u)$, where $AT_t(u)=-(MT_t(u)+HT_t(u)+CT_t(u))$; therefore, the optimization problem of service migration and resource allocation is described as $$\max \sum_{u=1}^{U} AT_t(u) \text{ s.t. } \sum_{u=1}^{U} \xi_t(u)F \le F_{ALL}$$

considering different decision types of service migration and resource allocation, the service migration and the resource allocation belong to two dimensions of P1, so P1 is decoupled into the following two sub-problems:

P2: the long-term delay of the system is minimized by optimizing the service migration, and this sub-problem is described as $$\min_{\rho_t(u)} \sum_{t=0}^{T} \sum_{u=1}^{U} (MT_t(u) + HT_t(u) + CT_t(u)) \text{ s.t. } C1$$

P3: the computation delay of the edge node m is minimized by optimizing the resource allocation after the service migration, and this sub-problem is described as $$\min_{\xi_t(u)} \sum_{u \in \mathcal{U}_m} \frac{K_t(u)}{\xi_t(u)F} \text{ s.t. } C2 - C3$$

In one embodiment of the present invention, the designing a new actor-critic-based asynchronous-update deep reinforcement learning method to explore the optimal service migration is implemented specifically as follows:

service migration in the MEC-based IoV system is a sequential decision problem that is modeled as a Markov decision process (MDP); in DRL, a 5-tuple $(\mathcal{S}, \mathcal{A}, \mathcal{P}, \mathcal{R}, \gamma)$ is used to process MDP, where $\mathcal{S}$, $\mathcal{A}$, $\mathcal{P}$, $\mathcal{R}$ and $\gamma$ indicate a state space, an action space, a state conversion, a reward function and a discount factor, respectively; a policy $\pi(\cdot|s_t)$ indicates an action distribution at a state $s_t$; a policy $\pi$ is given, the DRL agent firstly chooses and executes an action $a_t$ at the state $s_t$; then, an environment feeds back an instant reward $r_t$ and enters a next state $s_{t+1}$; through this interaction process, the DRL agent will obtain a trajectory $\tau=(s_t, a_t, r_t, s_{t+1}, a_{t+1}, r_t, \ldots, s_T, a_T, r_T)$ under the guidance of the policy $\pi$; a discounted cumulative reward of the trajectory $\tau$ is computed as $$G_t(\tau) = r_t + \gamma r_{t+1} + \gamma^2 r_{t+2} + \ldots + \gamma^{T-t} r_T = \sum_{i=t}^{T} \gamma^{i-t} r_i$$

Guided by a policy, multiple trajectories may be generated, $G_t(\tau)$ follows a random distribution, an expected reward is used to evaluate the value of taking $a_t$ at $s_t$, and a state-action value function is expressed as $$Q_\pi(s_t, a_t) = \mathbb{E}_\pi[G_t \mid S = s_t, A = a_t]$$

$$= r_t + \gamma \mathbb{E}_\pi[Q_\pi(s_{t+1}, a_{t+1}) \mid S = s_t, A = a_t]$$

The objective of DRL is to learn an optimal policy $\pi^*$ for maximizing the discounted cumulative reward at any initial state; the optimal action at each state is evaluated by the optimal state-action value function, expressed as $$Q*(s_t, a_t) = \max_\pi Q_\pi(s_t, a_t)$$

A new actor-critic-based asynchronous-update deep reinforcement learning (DRL) method is proposed to explore the optimal service migration in the MEC-based dynamic IoV system; in the optimization process of the service migration, the DRL agent selects $a_t$ at $s_t$, according to $\pi$ and the environment feeds back $r_t$ which is transmitted to $s_{t+1}$; this process is expressed as a Markov decision process (MDP); specifically, the state space, the action space and the reward function are defined as follows:

state space: the state at the time slot t includes information of IVs, that is, the location of the IV, the data volume of the tasks, the computational density of the tasks and service data, and information of the edge node where the service instance is located at the time slot t−1; therefore, the state is defined as $$s_t = [Loc_t(u), D_t(u), C_t(u), S_t(u), M_{t-1}^s(u)]_{u \in \mathcal{U}}$$

action space: at the time slot t, the DRL agent executes a service migration action $a_t$ corresponding to $s_t$, and the service instance of $IV_u$ is capable of being migrated to any edge node; therefore, the action is defined as $$a_t = [\rho_t(u)]_{u \in \mathcal{U}}$$

where $\rho_t(u) \in \mathcal{M}$ is a migration decision of $IV_u$;

reward function: the reward is negatively correlated with a long-term system delay, expressed as $$r_t = -\sum_{u=1}^{U} (MT_t(u) + HT_t(u) + CT_t(u))$$

To optimize P2, an actor-critic architecture and a deep deterministic policy gradient are adopted to train and optimize service migration policies in a complex and dynamic MEC-based IoV system, that is, the actor generates actions of the service migration, while the critic evaluates the Q-values of the actions, specifically as follows:

firstly, the actor $\mu$, the critic $\psi$, the target actor $\hat{\mu}$, the target critic $\hat{\psi}$, a replay memory X, the number of training episodes E and the maximum time slot T per episode are initialized; on each training episode, the IVs creates service instances on the nearest edge node; at the time slot t, $s_t$ is input into the actor $\mu$, which generates and executes an action of service migration $a_t$; then, the optimal resource allocation of the service instances on each edge node is obtained through convex optimization; then $r_t$ is calculated, and the state is switched to $s_{t+1}$; a sample ($s_t$, $a_t$, $r_t$, $s_{t+1}$) is stored into X, and N samples are drawn randomly from X to train network parameters; then, the cumulative expected discount reward is calculated, and the loss of the critic is minimized by an Adam optimizer, so that the updated critic is capable of better fitting in Q*($s_t$, $a_t$); then, a delayed-update mechanism is designed to solve the problem of the fluctuating update of the actor, and the actor is updated only after the critic has been updated $\lambda$ times; since the optimization objective of the actor is $J(\theta_\mu) = \mathbb{E}_{\theta_\mu}[\psi(s_t, \mu(s_t|\theta_\mu)|\theta_\psi)]$, the actor is updated by adjusting the parameter $\theta_{82}$, so that the output $\mu(s_t|\theta_\psi)$ is capable of being updated in an upward direction according to $\psi(s_t,\mu(s_t|\theta_\mu)|\theta_\psi)$ calculated by the critic; and specifically, the gradient ascent is used to update the actor, and the network parameters of the target actor and the target critic are implemented through soft update.

In one embodiment of the present invention, the proposing an optimal resource allocation method for an MEC server based on convex optimization to achieve the optimal resource allocation is implemented specifically as follows:

an index of $U_m$ is reassigned into $\mathcal{Z} = \{1, 2, \ldots z, \ldots, Z\}$, and C2 is rewritten correspondingly, so the following formula $$\min_{\xi_t(u)} \sum_{u \in \mathcal{U}_m} \frac{K_t(u)}{\xi_t(u)F} \quad \text{s.t. } C2-C3$$

is redefined as $$Y[\xi_t(1), \xi_t(2), \ldots, \xi_t(Z)] = \min_{\xi_t(z)} \sum_{z=1}^{Z} \frac{K_t(z)}{\xi_t(z)F}$$

$$\text{s.t. } C3: \sum_{z=1}^{Z} \xi_t(z) - 1 \le 0, t \in T, z \in \mathcal{Z},$$

$$C4: -\xi_t(z) \le 0, t \in T, z \in \mathcal{Z},$$

$$C5: \xi_t(z) - 1 \le 0, t \in T, z \in \mathcal{Z},$$

where C2 is converted into C4 and C5, indicating an upper limit and a lower limit of the allocated resource proportion;

the Hessian matrix is a square matrix that is formed by a second-order partial derivative of a multivariate function; the Hessian matrix of the above formula is defined as $$H = \begin{bmatrix} \dfrac{\partial^2 Y}{\partial[\xi_t(1)]^2} & \dfrac{\partial^2 Y}{\partial \xi_t(1)\partial \xi_t(2)} & \cdots & \dfrac{\partial^2 Y}{\partial \xi_t(1)\partial \xi_t(Z)} \\ \dfrac{\partial^2 Y}{\partial \xi_t(2)\partial \xi_t(1)} & \dfrac{\partial^2 Y}{\partial[\xi_t(2)]^2} & \cdots & \dfrac{\partial^2 Y}{\partial \xi_t(2)\partial \xi_t(Z)} \\ \vdots & \vdots & \ddots & \vdots \\ \dfrac{\partial^2 Y}{\partial \xi_t(Z)\partial \xi_t(1)} & \dfrac{\partial^2 Y}{\partial \xi_t(Z)\partial \xi_t(2)} & \cdots & \dfrac{\partial^2 Y}{\partial[\xi_t(Z)]^2} \end{bmatrix}$$

Where $$\frac{\partial^2 Y}{\partial \xi_t(i)\partial \xi_t(j)} = \begin{cases} 0, & i \ne j \\ \dfrac{2K_t(i)}{[\xi_t(i)]^2 F}, & i = j \end{cases}$$

$$\forall i, j \in \mathcal{Z}, K_t(\cdot) \ge 0 \text{ and } \xi_t(\cdot) \ge 0$$

F is a non-zero real number; moreover, the values on the diagonal of the Hessian matrix are all positive, so the Hessian matrix is a symmetric positive definite matrix, so P3 is a convex programming problem;

according to the optimality theorem of the convex programming, any feasible KKT point is a global optimal point; in addition, the generalized Lagrange function is defined as $$L = \sum_{z=1}^{Z} \frac{K_t(z)}{\xi_t(z)F} + \beta\left(\sum_{z=1}^{Z} \xi_t(z) - 1\right) + \sum_{z=1}^{Z} \eta_z(-\xi_t(z)) + \sum_{z=1}^{Z} \zeta_z(\xi_t(z) - 1),$$

where $\forall \beta, \eta_z, \zeta_z, z \in \mathcal{Z}$ are Lagrange multipliers corresponding to C3, C4 and C5, respectively;

therefore, $$Y[\xi_t(1), \xi_t(2), \ldots, \xi_t(Z)] = \min_{\xi_t(z)} \sum_{z=1}^{Z} \frac{K_t(z)}{\xi_t(z)F}$$

$$\text{s.t. } C3: \sum_{z=1}^{Z} \xi_t(z) - 1 \le 0, t \in T, z \in \mathcal{Z},$$

$$C4: -\xi_t(z) \le 0, t \in T, z \in \mathcal{Z},$$

$$C5: \xi_t(z) - 1 \le 0, t \in T, z \in \mathcal{Z},$$

the KKT conditions of the redefined P3 in the following formula are described as $$\begin{cases} -\dfrac{K_t(z)}{[\xi_t(z)]^2 F} + \beta - \eta_z + \varsigma_z = 0, t \in T, z \in Z, \\ \beta\left(\sum_{z=1}^{Z}\xi_t(z) - 1\right) = 0, \sum_{z=1}^{Z}\xi_t(z) - 1 \le 0, t \in T, z \in Z, \\ \eta_z(-\xi_t(z)) = 0, -\xi_t(z) \le 0, t \in T, z \in Z, \\ \varsigma_z(\xi_t(z) - 1) = 0, \xi_t(z) - 1 \le 0, t \in T, z \in Z, \\ \beta \ge 0, \eta_z > 0, \varsigma_z \ge 0, t \in T, z \in Z. \end{cases}$$

11                                                         12 according to the above KKT conditions, the optimal resource allocation is derived by the following formula:

$$\xi_t(z) = \frac{\sqrt{K_t(z)}}{\sum_{z=1}^{Z} \sqrt{K_t(z)}}, \, t \in T, z \in \mathcal{Z},$$

each MEC server is capable of obtaining the optimal resource allocation for the service instances.

Compared with the prior art, the present invention has the following beneficial effects:

According to SeMiR, a novel service migration framework provided by the present invention, the service migration and resource allocation in the dynamic and complex MEC-based IoV system are deemed as a long-term QoS optimization problem, and the problem is decoupled into two sub-problems. For the sub-problem of the service migration, an improved DRL method is designed and adopts delayed and one-step update mechanisms. For the sub-problem of the resource allocation, the optimal resource allocation based on convex optimization is derived theoretically. Extensive experiments are conducted based on a real-world testbed and a dataset of city vehicle trajectories, thereby verifying the effectiveness of the SeMiR. Compared with benchmark methods, the SeMiR achieves better performance under these scenarios with different bandwidths, unit migration delay coefficients and numbers of vehicles. Moreover, the SeMiR achieves faster convergence speed and superior convergence effect than the advanced DQN and DDPG methods. In addition, real-world testbed experiments validate the feasibility and practicability of the SeMiR in reducing the service delay of IVs.

DETAILED DESCRIPTION OF THE EMBODIMENTS

The technical solution of the present invention is described in detail below with reference to the accompanying drawings.

The present invention proposes a QoS-aware service migration method in an IoV system based on CVX deep reinforcement learning, that is, SeMiR, which is a novel service migration framework based on convex optimization deep reinforcement learning. The main contributions are summarized as follows.

A unified service migration and resource allocation model is designed for a complex and dynamic MEC-based IoV system. Firstly, long-term QoS is set as an optimization objective, where Qos includes a migration delay, a communication delay and a computation delay, involving two subproblems of solving a service migration and a resource allocation. Then, the two sub-problems of service migration and resource allocation are decoupled and formulated, respectively.

For the sub-problem of service migration, a new actor-critic-based asynchronous-update DRL method is proposed to explore an optimal migration policy. Specifically, the actor with delayed-update makes a migration decision according to the system state, while the critic with one-step-update evaluates the decision value and offers accurate guidance for policy update.

For the sub-problem of resource allocation, a new method based on convex optimization is proposed. Firstly, it is proved that the sub-problem is a convex programming problem by a Hessian matrix with constraint conditions. Then, based on the convex optimization theory, a generalized Lagrange function and a Karush-Kuhn-Tucker (KKT) condition of the sub-problem are defined. Finally, the optimal resource allocation of each MEC server under a given migration decision is theoretically derived.

Extensive experiments are conducted based on a real testbed and a dataset of city vehicle trajectories, thereby verifying the feasibility effectiveness of the SeMiR. Compared with benchmark methods, the SeMiR has the best performance of service migration under various scenarios.

Figure 1:
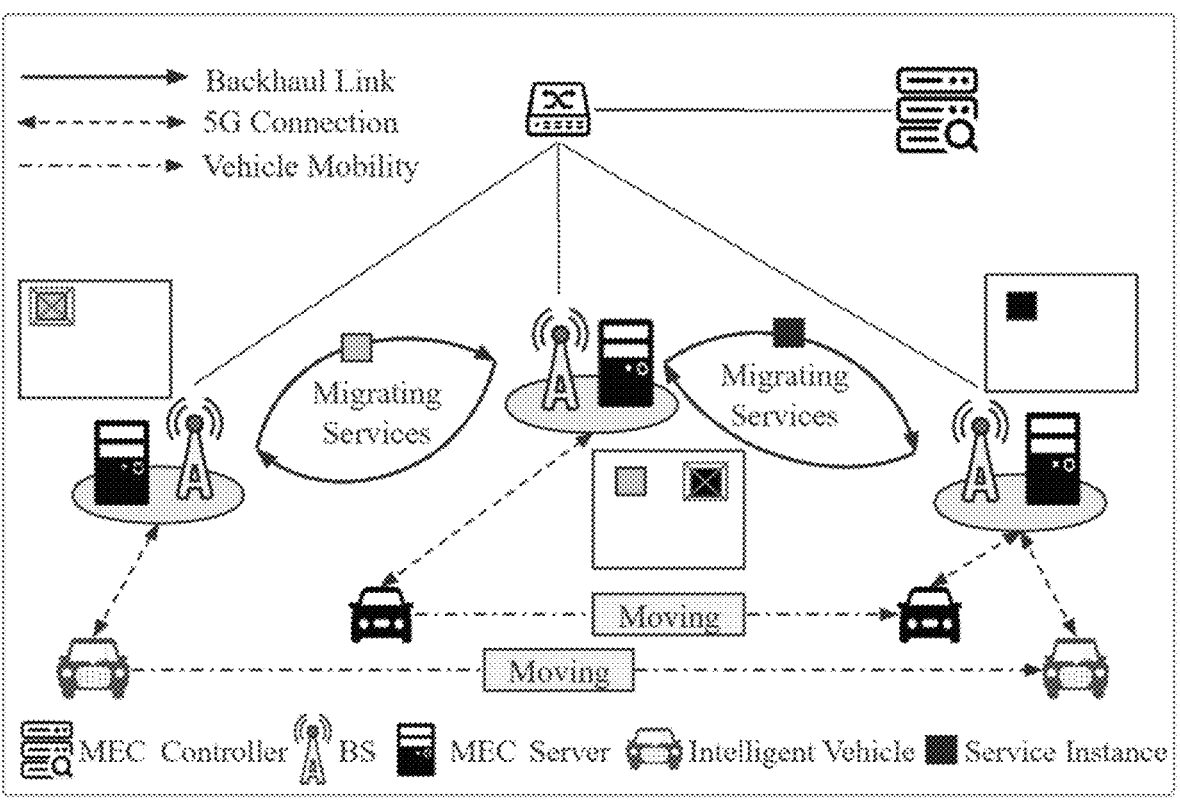
FIG. 1 is an MEC-based IoV service migration system according to the present invention.

The specific implementation process of the present invention is described as follows:

as shown in FIG. 1, the MEC-based service migration system proposed for the IoV is composed of 1 MEC controller, M BSs and U intelligent vehicles (IV). Each BS is equipped with an MEC server, named an edge node. The set of the edge nodes (index is m) is expressed as M={1, 2, . . . , m, . . . , M}, and the set of IVs (index is u) is expressed as U={1, 2, . . . , u, . . . , U}. Firstly, $IV_u$ sends a task to a corresponding server instance in the 5G network, and then the BS forwards the task to the MEC server where the service instance is located. Then, the MEC server processes the task and returns the result. The MEC controller gathers and transmits information to a DRL agent, and the DRL agent generates a service migration decision of IVs.

The system runs in a discrete time slot, and the location of $IV_u$ may change at the beginning of each time slot t, where $t \in \{0, 1, 2, . . . , T\}$. Meanwhile, an intelligent application on $IV_u$ generates a computation-intensive task at each time slot, denoted as $Task_t(u)$. Due to the limited computational capability of $IV_u$, these tasks are continuously offloaded to the MEC server for processing. At the first time slot, $IV_u$ accesses the system through the nearest BS and creates a service instance on the corresponding MEC server. In the subsequent time slots, the service instance provides a computing service for the $IV_u$. $IV_u$ is moved to be connected to the nearest edge node and the task is sent. In a case that $IV_u$ drives out of the communication coverage of the current edge node, the connection will be interrupted and $IV_u$ will be reconnected to the nearest edge node. The tasks output by IVs are processed by the own service instances, and these instances run in parallel and consume part of the computational resources on the MEC servers.

At the time slot t, the edge node connected to $IV_u$ is denoted as $$M_t^i(u) \in \mathcal{M}$$

and the edge node where the service instance of $IV_u$ is located is denoted as $$M_t^s(u) \in \mathcal{M}$$

It should be noted that the edge nodes are interconnected through stable backhaul links. In a case that $IV_u$ is disconnected from $$M_t^s(u),$$

the task thereon still can be transmitted to $$M_t^s(u)$$

through the backhaul link, but this may cause an additional communication delay. This additional delay can be avoided in a case that the service instance is migrated to $$M_t^l(u),$$

but the migration of service data also leads to a migration delay. Therefore, it is hard to reduce the above delays effectively while ensuring QoS even if suitable time and destination of service migration are determined. In addition, when the service instance is migrated to the edge node, it is necessary to allocate a proper computation resource to reduce the computation delay of the task. With the above concerns, the joint optimization problem of service migration and resource allocation is proposed to reduce a migration delay, a communication delay and a computation delay of the system.

A. Migration Model $$M_{t-1}^s(u) \in \mathcal{M}$$

is defined as an edge node where a service instance of $IV_u$ is located at a time slot $t-1$, and $\rho_t(u) \in M$ is defined as a migration decision of $IV_u$ at a time slot $t$, where $$M_t^s(u)$$

depends on $\rho_t(u)$. In addition, a hop distance between $$M_{t-1}^s(u)$$

and $$M_t^s(u)$$

is measured through $\delta_t(u)$. In a case that $$M_{t-1}^s(u) = M_t^s(u), \delta_t(u) = 0,$$

no service migration happens at the current time slot. Otherwise, the service instance of $IV_u$ will be migrated from $$M_{t-1}^s(u)$$

to $$M_t^s(u),$$

and in this period, a migration delay occurs. This delay is commonly caused by service interruption and is increased with the increase of the amount of service data and the hop distance. Therefore, the migration delay is a monotonic non-decreasing function of $\delta_t(u)$, expressed as $$MT_t(u) = \begin{cases} 0, & \delta_t(u) = 0 \\ \dfrac{S_t(u)}{\chi} + \mu^m \delta_t(u) & \delta_t(u) \neq 0 \end{cases}, \tag{1}$$

where $S_t(u)$ is service data of $IV_u$, $\chi$ is a network bandwidth of the backhaul link, and $\mu^m$ is a unit migration delay coefficient that indicates the migration delay per hop.

B. Communication Model

After service migration, $IV_u$ offloads $Task_t(u)$ to a service instance on $$M_t^s(u)$$

for processing, and in this period, a communication delay is generated and includes a data transmission delay between $IV_u$ and $$M_t^l(u)$$

and a transmission delay of the backhaul link between $$M_t^l(u) \text{ and } M_t^s(u).$$

A signal-to-noise ratio (SNR) between $IV_u$ and $$M_t^l(u)$$

is expressed as:

$$SNR\left(u, M_t^l(u)\right) = \dfrac{P_u G\left(u, M_t^l(u)\right)}{\sigma^2}, \tag{2}$$

where $P_u$ is a transmission power of $IV_u$, and $\sigma^2$ is Gaussian noise, $$G\left(u, M_t^l(u)\right) \qquad\qquad 5$$

that is, a channel gain between $IV_u$ and $$M_t^l(u),$$

expressed as $$G\left(u, M_t^l(u)\right) = \frac{\alpha}{\left|Len\left(u, M_t^l(u)\right)\right|^2}, \qquad (3)$$

where $$Len\left(u, M_t^l(u)\right)$$

is a distance between $IV_u$ and $$M_t^l(u),$$

and $\alpha$ is a channel gain per unit distance.

Then, a total bandwidth of the BS is denoted as B, B is equally allocated to vehicles at each time slot based on orthogonal frequency division multiplexing (OFDM). Therefore, a wireless uplink rate of $IV_u$ is defined as $$R_t(u) = B_t(u)\log\left(1 + SNR\left(u, M_t^l(u)\right), \qquad (4)\right.$$

where $B_t$ is an available bandwidth of $IV_u$.

Then, the data transmission delay of $IV_u$ is defined as $$PT_t(u) = \frac{D_t(u)}{R_t(u)}, \qquad (5)$$

where $D_t(u)$ is a data volume of $Task_t(u)$.

In a case that $$M_t^l(u) \neq M_t^s(u),$$

$Task_t(u)$ will be transmitted on the backhaul link. The transmission delay of the backhaul link depends on $D_t(u)$ and a hop distance between $$M_t^l(u) \text{ and } M_t^s(u).$$

Similar to the formula (1), the hop distance is measured through $$\phi_t^{ls}(u).$$

Since the data volume of the task result is small, the transmission delay is negligible. Therefore, the transmission delay of the backhaul link is expressed as $$ST_t(u) = \begin{cases} 0, & \phi_t^{ls}(u) = 0 \\ \dfrac{D_t(u)}{X} + \mu^h \phi_t^{ls}(u), & \phi_t^{ls}(u) \neq 0 \end{cases}, \qquad (6)$$

where $\mu^h$ is a unit transmission delay coefficient that indicates a transmission delay per hop.

Therefore, the communication delay is expressed as $$HT_t(u) = PT_t(u) + ST_t(u). \qquad (7)$$

C. Computation Model

When $Task_t(u)$ is offloaded to $$M_t^s(u),$$

the MEC server will allocate computational resources to the service instance to process the task. A CPU cycle required to process $Task_t(u)$ is defined as $$K_t(u) = D_t(u)C_t(u), \qquad (8)$$

where $C_t(u)$ is a computational density of $Task_t(u)$ and indicates the CPU cycle for processing one-bit task data.

The maximum computational capability of the MEC server (that is, a CPU frequency) is denoted as F. Therefore, the computation delay is expressed as $$CT_t(u) = \frac{K_t(u)}{\xi_t(u)F}, \qquad (9)$$

where $\xi_t(u)$ indicates the proportion of the computational resources allocated to the service instance of $IV_u$.

D. Optimization Objective

Within T time slots, the objective is to minimize the long-term delay of the MEC-based IoV system, including a migration delay, a communication delay and a computation delay, that is, to solve the following optimization problem.

$$P1: \min_{\rho_t(u), \xi_t(u)} \sum_{t=0}^{T} \sum_{u=1}^{U} (MT_t(u) + HT_t(u) + CT_t(u)) \qquad (10)$$

$$\text{s.t.} \quad C1: \rho_t(u) \in \mathcal{M}, t \in T, u \in \mathcal{U},$$

$$C2: \xi_t(u) \in [0, 1], t \in T, u \in \mathcal{U},$$

$$C3: \sum_{u \in \mathcal{U}_m} \xi_t(u) \leq 1, t \in T, m \in \mathcal{M},$$

where IVs that migrate the service instances to the edge node m are expressed as a set $U_m$. C1 indicates a constraint of a migration decision. C2 indicates a constraint of a resource proportion allocated to the service instance. C3 indicates a constraint of a proportion sum in C2.

Lemma1. P is an NP-hard problem.

Proof. For clarity, a knapsack problem (KP) that is also an NP-hard problem is introduced. In KP, there is a knapsack with items W and I, expressed as a set I={1, 2, . . . , i, . . . , I}. The KP aims to find an item sub-set O⊆I to maximize the total value of the items in the knapsack. Therefore, KP is defined as $$\max \sum_{i \in O} v_i \quad \text{s.t.} \sum_{i \in O} w_i \le W, \tag{11}$$

where $w_i$ and $v_i$ are the weight and value of the item i.

A specific problem P1 is considered first. At the time slot t, there are U IVs and M edge nodes. IVs are moving and the computational resources of the edge nodes are limited, and thus it is necessary to migrate the service instances among the edge nodes. After the service migration, $IV_u$ may offload the task thereof to the corresponding service instance for processing. A total computational resource of the MEC server is denoted as $F_{ALL}$, and a total delay is defined as $AT_t(u)$, where $AT_t(u)=-(MT_t(u)+HT_t(u)+CT_t(u))$. Therefore, the optimization problem in this example may be described as $$\max \sum_{u=1}^{U} AT_t(u) \quad \text{s.t.} \sum_{u=1}^{U} \xi_t(u)F \le F_{ALL}. \tag{12}$$

It is worth noting that P1 in this example is a KP problem and is also an NP-hard problem. P1 considers the long-term system optimization and requires problem stacking in this example over multiple time slots. Therefore, P1 is an NP-hard problem.

Considering different decision types of the service migration and resource allocation, P1 may be deemed as a mixed integer nonlinear programming problem that is extremely hard to be solved directly. It should be noted that the service migration and the resource allocation belong to two dimensions of P1, thereby being difficult to process uniformly. Therefore, P1 is decoupled into the following two sub-problems.

P2: the long-term delay of the system is minimized by optimizing the service migration. This sub-problem is described as $$\min_{\rho_t(u)} \sum_{t=0}^{T} \sum_{u=1}^{U} (MT_t(u) + HT_t(u) + CT_t(u)) \quad \text{s.t. } C1. \tag{13}$$

P3: the computation delay of the edge node m is minimized by optimizing the resource allocation after the service migration. This sub-problem is described as $$\min_{\xi_t(u)} \sum_{u \in \mathcal{U}_m} \frac{K_t(u)}{\xi_t(u)F} \quad \text{s.t. } C2 - C3. \tag{14}$$

According to a novel QoS-aware service migration framework of the present invention, the problems P2 and P3 are solved by deep reinforcement learning (SeMiR) based on convex optimization.

A. Service Migration Based on an Improved DRL

Service migration in an MEC-based IoV system is a sequentially decision problem that may be modeled as a Markov decision procession (MDP). In DRL, a 5-tuple ($\mathcal{S}$, $\mathcal{A}$, $\mathcal{P}$, $\mathcal{R}$, $\gamma$) is commonly used to process MDP, where $\mathcal{S}$, $\mathcal{A}$, $\mathcal{P}$, $\mathcal{R}$ and $\gamma$ indicate a state space, an action space, a state transition, a reward function and a discount factor, respectively. The policy $\pi(\cdot|s_t)$ indicates an action distribution at a state $S_t$. Given a policy $\pi$, the DRL agent firstly chooses and executes an action $a_t$ at a state $s_t$. Then, the environment feeds back an instant reward $r_t$ and enters a next state $s_{t+1}$. Through this interaction process, DRL will obtain a trajectory $\tau=\{s_t, a_t, r_t, s_{t+1}, a_{t+1}, r_{t+1}, \ldots, s_T, a_T, r_T\}$ under the guidance of the policy $\pi$. The discounted cumulative reward of the trajectory $\tau$ may be calculated by $$G_t(\tau) = r_t + \gamma r_{t+1} + \gamma^2 r_{t+2} + \ldots + \gamma^{T-t} r_T = \sum_{i=t}^{T} \gamma^{i-t} r_i. \tag{15}$$

Guided by a policy, multiple trajectories may be generated, and $G_t(\tau)$ follows a random distribution. The expected reward is used to evaluate the value of $a_t$ at $s_t$, and a state-action value function is expressed as $$Q_\pi(s_t, a_t) = \mathbb{E}_\pi[G_t \mid S = s_t, A = a_t] \tag{16}$$
$$= r_t + \gamma \mathbb{E}_\pi[Q_\pi(s_{t+1}, a_{t+1}) \mid S = s_t, A = a_t].$$

The objective of DRL is to learn an optimal policy $\pi^*$ for maximizing the discounted cumulative reward at any initial state. The optimal action at each state is evaluated by the optimal state-action value function, $$Q*(s_t, a_t) = \max_\pi Q_\pi(s_t, a_t). \tag{17}$$

The value-based DRL (such as DQN) uses a deep neural network (DNN) to approximate $Q^*(s_t, a_t; \theta_Q)$, where $\theta_Q$ indicates DNN parameters, and a deterministic policy is learned by selecting the action with a maximum Q-value. However, the huge action space in the MEC-based IoV system seriously affects the learning efficiency. Meanwhile, the value-based DRL updates the target network by bootstrapping a Q-network, and the Q-network is a biased estimation of a true action value and may fall into a local optimum. By comparison, the policy-based DRL selects the action according to a probability distribution and can better process the huge action space. Unless the policy tends to be deterministic, the probability of selecting any action is small, thereby causing an unstable training process.

Figure 2:
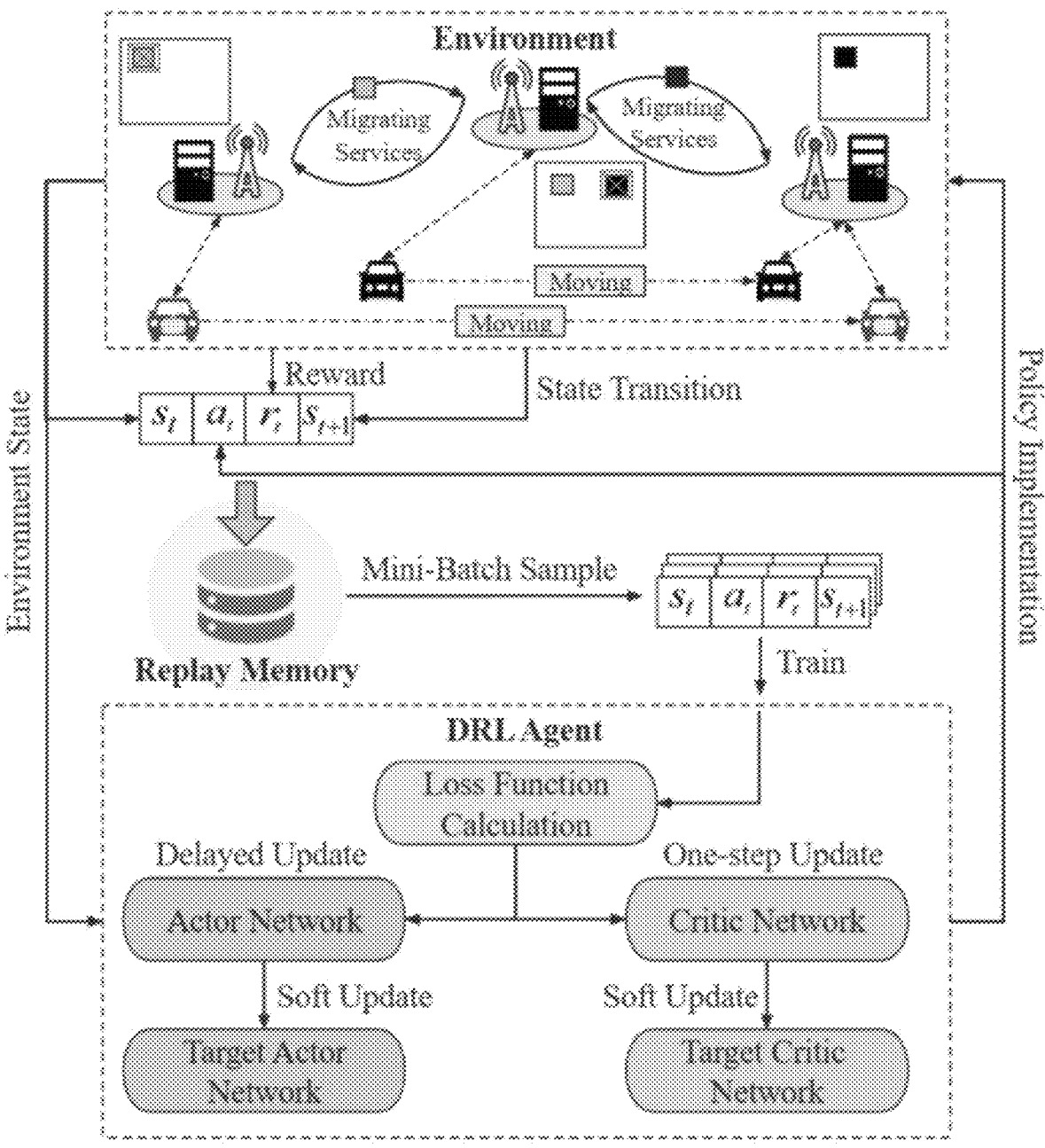
FIG. 2 is an improved DRL method of service migration.

To solve these problems, a new actor-critic-based asynchronous-update DRL is proposed to explore an optimal service migration in the MEC-based dynamic IoV system. As shown in FIG. 2, in the optimization process of the service migration, the DRL agent selects $a_t$ at $s_t$ according to $\pi$, and the environment feeds back and transmits $r_t$ to $s_{t-1}$.

This process may be expressed as MDP. Specifically, the state space, the action space and the reward function are defined as follows.

State space: the state at the time slot t includes information of IVs, that is, the location of the IV, the data volume of the tasks, the computational density of the tasks and service data, and information of the edge node where the service instance is located at the time slot t−1. Therefore, the state is defined as $$s_t = [Loc_t(u), D_t(u), C_t(u), S_t(u), M_{t-1}^s(u)]_{u \in \mathcal{U}}. \tag{18}$$

Action space: at the time slot t, the DRL agent executes a service migration action $a_t$ corresponding to $s_t$. The service instance of $IV_u$ may be migrated to any edge node. Therefore, the action is defined as $$a_t = [\rho_t(u)]_{u \in \mathcal{U}}, \tag{19}$$

where $\rho_t(u) \in \mathcal{M}$ is a migration decision of $IV_u$.

Reward function: the reward is negatively correlated with a long-term system delay (including migration, communication and computation delays), expressed as $$r_t = -\sum_{u=1}^{U} (MT_t(u) + HT_t(u) + CT_t(u)). \tag{20}$$

To optimize P2, the method adopts an actor-critic architecture and a deep deterministic policy gradient to train and optimize service migration policies in a complex and dynamic MEC-based IoV system. Specifically, the actor generates actions of the service migration, while the critic evaluates the Q-values of the actions. The critic enables fast convergence and accurately evaluates the actions by virtue of one-step-update, thereby effectively guiding the update of the actor and significantly reducing the error when the policy gradient is evaluated.

Key steps of the method are given in Algorithm 1. Firstly, the actor μ, the critic ψ, the target actor μ̂, the target critic ψ̂, the replay memory X, the number of training episodes E and the maximum time slot per episode T (Lines 1-3) are initialized. At each training episode, the IVs create service instances on the nearest edge nodes (Lines 5-6). At the time slot t, $s_t$ is input into the actor μ, which generates and executes an action of the service migration $a_t$ (Lines 8-9). Then, the optimal resource allocation of the service instances on each edge node is obtained through convex optimization (Lines 10-12), and the details will be given in the next subsection. Then, $r_t$ is calculated, and the state is switched to $s_{t+1}$ (Line 13). A sample ($s_t$, $a_t$, $r_t$, $s_{t+1}$) is stored into X, and N samples are randomly drawn from X to train network parameters (Lines 14-15). It is worth noting that the correlation among training samples is broken by using the replay memory, thereby alleviating the instability that occurs in the training process. Then, the cumulative expected discount rewards is calculated, and the loss of the critic is minimized by an Adam optimizer (Lines 16-17), so that the updated critic can better fit in $Q^*(s_t, a_t)$. Then, a delayed-update mechanism is designed to solve the fluctuating update problem of the actor, while the actor is updated only after the critic has been updated λ times (Lines 18-21). Since the optimization objective of the actor is $J(\theta_\mu) = \mathbb{E}_{\theta_\mu}[\psi(s_t, \mu(s_t|\theta_\mu)|\theta_\psi)]$, the actor can be updated by adjusting $\theta_\mu$, so that the output $\mu(s_t|\theta_\mu)$ can be updated in an upward direction according to $\psi(s_t, \mu(s_t|\theta_\mu)|\theta_\psi)$ calculated by the critic. Specifically, the gradient ascent is used to update the actor, and the network parameters of the target actor and the target critic are updated through a soft update (Lines 19-20).

| | Algorithm 1: An improved DRL for service migration |
|---|---|
| 1 | Initialize the actor μ and critic ψ with network parameters $\theta_\mu$ and $\theta_\psi$ |
| 2 | Initialize the target actor μ̂ and critic ψ̂ with network parameters $\theta_{\hat{\mu}} \leftarrow \theta_\mu$, $\theta_{\hat{\psi}} \leftarrow \theta_\psi$ |
| 3 | Initialize the replay memory X, training episodes E. and maximum time slot T per episode |
| 4 | for episode = 1, 2, . . . , E do |
| 5 |   | Get initial state: $s_0$ = env.reset( ); |
| 6 |   | Create service instances on the nearest nodes; |
| 7 |   | for t = 1,2, . . . , T do |
| 8 |   |   | Update IVs' locations and generate service migration decision $a_t$:$a_t = \mu(s_t \mid \theta_\mu) + \mathcal{E}$ ; |
| 9 |   |   | Excute service migration decision $a_t$; |
| 10 |   |   | for each m ∈ $\mathcal{M}$ do |
| 11 |   |   |   | Dervice the optimal resource allocation via convex optimization; |
| 12 |   |   | end |
| 13 |   |   | Calculation reward and perform state transition: $r_t$, $s_{t+1}$ = env.step($a_t$); |
| 14 |   |   | Store training sample: X.push($s_t$, $a_t$, $r_t$, $s_{t+1}$); |
| 15 |   |   | Draw N samples from X: $N^*(s_t, a_t, r_t, s_{t+1})$ = X.sample(N); |
| 16 |   |   | Calculate cumulative expected discount rewards: $y_t = r_t + \gamma\hat{\psi}(s_{t+1}, \hat{\mu}(s_{t+1} \mid \theta_{\hat{\mu}}) \mid \theta_{\hat{\psi}})$; |
| 17 |   |   | Calculate loss function and update critic: $Loss_\psi = \frac{1}{N}\sum_1^N (y_t - \psi(s_t, a_t \mid \theta_\psi))^2$; |
| 18 |   |   | if t%λ = 0 then |
| 19 |   |   |   | Update actor using gradient ascent: $\nabla_{\theta_\mu} J = \frac{1}{N}\sum_1^N \nabla_{a_t} \psi(s_t, a_t \mid \theta_\psi) \nabla_{\theta_\mu}\mu(s_t \mid \theta_\mu)$; |
| 20 |   |   |   | Soft update target network parameters: $\theta_{\hat{\mu}} \leftarrow \omega\theta_\mu + (1 - \omega)\theta_{\hat{\mu}}$, $\theta_{\hat{\psi}} \leftarrow \omega\theta_\psi + (1 - \omega)\theta_{\hat{\psi}}$; |
| 21 |   |   | end |
| 22 |   | end |
| 23 | end |

B. Resource Allocation Based on Convex Optimization

To optimize P3, a new resource allocation method based on convex optimization is designed. Firstly, it is proved that P3 is a convex programming problem based on constraints of P3 and a Hessian matrix. Secondly, under the guidance of a convex optimization theory, a generalized Lagrange function is defined, and the KKT conditions of P3 are solved. Finally, the optimal resource allocation of each MEC server is theoretically derived under the given service migration decision.

Lemma2. P3 is a convex programming problem.

Proof. The lemma can be proved in a case that P3 and a constraint in the formula (14) are both convex functions. Firstly, it is noted that C2 and C3 are linearly constrained, thereby reflecting convexity. Then, it is only necessary to prove that P3 is also a convex function.

To clarify the derivation process, the index of $U_m$ is reassigned as $\mathcal{Z} = \{1, 2, . . . , z, . . . , Z\}$, and C2 is correspondingly rewritten.

Therefore, the formula (14) is redefined as $$Y[\xi_t(1), \xi_t(2), \ldots, \xi_t(Z)] = \min_{\xi_t(z)} \sum_{z=1}^{Z} \frac{K_t(z)}{\xi_t(z)F} \tag{21}$$

$$\text{s.t. } C3: \sum_{z=1}^{Z} \xi_t(z) - 1 \leq 0, t \in T, z \in \mathcal{Z},$$

$$C4: -\xi_t(z) \leq 0, t \in T, z \in \mathcal{Z},$$

$$C5: \xi_t(z) - 1 \leq 0, t \in T, z \in \mathcal{Z},$$

where C2 is converted into C4 and C5, indicating an upper limit and a lower limit of the allocated resource proportion.

The Hessian matrix is a square matrix that is formed by a second-order partial derivative of a multivariate function. The Hessian matrix of the formula (21) is defined as $$H = \begin{bmatrix} \dfrac{\partial^2 Y}{\partial [\xi_t(1)]^2} & \dfrac{\partial^2 Y}{\partial \xi_t(1)\partial \xi_t(2)} & \cdots & \dfrac{\partial^2 Y}{\partial \xi_t(1)\partial \xi_t(Z)} \\ \dfrac{\partial^2 Y}{\partial \xi_t(2)\partial \xi_t(1)} & \dfrac{\partial^2 Y}{\partial [\xi_t(2)]^2} & \cdots & \dfrac{\partial^2 Y}{\partial \xi_t(2)\partial \xi_t(Z)} \\ \vdots & \vdots & \ddots & \vdots \\ \dfrac{\partial^2 Y}{\partial \xi_t(Z)\partial \xi_t(1)} & \dfrac{\partial^2 Y}{\partial \xi_t(Z)\partial \xi_t(2)} & \cdots & \dfrac{\partial^2 Y}{\partial [\xi_t(Z)]^2} \end{bmatrix}, \tag{22}$$

where $$\frac{\partial^2 Y}{\partial \xi_t(i)\partial \xi_t(j)} = \begin{cases} 0, & i \neq j \\ \dfrac{2K_t(i)}{[\xi_t(i)]^3 F}, & i = j \end{cases}, \tag{23}$$

In the formula, $\forall i,j \in \mathcal{Z}$, $K_t(\bullet) \geq 0$ and $\xi_t(\bullet) \geq 0$.

It is noted that F is a non-zero real number. Moreover, the values on the diagonal of the Hessian matrix are all positive, so the Hessian matrix is a symmetric positive definite matrix. Based on the aforementioned analysis and convex optimization theory, it is proved that P3 is a convex programming problem.

According to the optimality theorem of the convex programming, any feasible KKT point is a global optimal point. In addition, the generalized Lagrange function is defined as $$L = \sum_{z=1}^{Z} \frac{K_t(z)}{\xi_t(z)F} + \tag{24}$$

$$\beta\left(\sum_{z=1}^{Z} \xi_t(z) - 1\right) + \sum_{z=1}^{Z} \eta_z(-\xi_t(z)) + \sum_{z=1}^{Z} \zeta_z(\xi_t(z) - 1),$$

where $\forall \beta, \eta_z, \zeta_z$, $z \in \mathcal{Z}$ are multipliers corresponding to C3, C4 and C5, respectively.

Therefore, the KKT conditions of the redefined P3 in the formula (21) may be described as $$\begin{cases} -\dfrac{K_t(z)}{[\xi_t(z)]^2 F} + \beta - \eta_z + \zeta_z = 0, t \in T, z \in Z, \\ \beta\left(\sum_{z=1}^{Z} \xi_t(z) - 1\right) = 0, \sum_{z=1}^{Z} \xi_t(z) - 1 \leq 0, t \in T, z \in Z, \\ \eta_z(-\xi_t(z)) = 0, -\xi_t(z) \leq 0, t \in T, z \in Z, \\ \zeta_z(\xi_t(z) - 1) = 0, \xi_t(z) - 1 \leq 0, t \in T, z \in Z, \\ \beta \geq 0, \eta_z \geq 0, \zeta_z \geq 0, t \in T, z \in Z \ .. \end{cases} \tag{25}$$

According to the above KKT conditions, the optimal resource allocation may be derived by the following formula:

$$\xi_t(z) = \frac{\sqrt{K_t(z)}}{\sum_{z=1}^{Z} \sqrt{K_t(z)}}, t \in T, z \in \mathcal{Z}; \tag{26}$$

$\forall t \in T$, each MEC server can obtain the optimal resource allocation of the service instances (Lines 10-12 in Algorithm 1), and thus the DRL agent can learn a better migration policy.

Performance Evaluation

According to the present invention, the SeMiR is evaluated and analyzed through extensive simulation and testbed experiments.

A. Experiment Settings

Datasets and parameter settings Based on the real dataset of the vehicle trajectory in Rome, the region of the city center is considered as our experiment scenario. There are four base stations including MEC servers in the scenario, and the communication coverage is 1 km². The bandwidth of each base station is 10 MHz, and the computational capability of each MEC server is 20 GHz. At the initial, 20 IVs are connected to the nearest edge nodes, and the MEC servers create the service instances for the IVs. An episode has 60 time slots, and IVs continuously send tasks to the service instances at fixed intervals. A workstation for conducting experiments is equipped with one 8-core 3.2 GHz Intel(R) Xeon(R) Silver 4208 CPU and two NVIDIA GeForce RTX 3090 GPU (24 GB RAM). Based on Python 3.8 and Pytorch, a neural network is built and trained in SeMiR. The SeMiR has two hidden layers with 256 and 128 neurons, respectively. In addition, the batch size N is 64, the delayed update parameter $\lambda$ is 10, the soft update parameter $\omega$ is 0.01, the learning rates of the actor and the critic are 0.00001 and 0.0001, respectively, and the reward discount factor $\gamma$ is 0.90. The trained SeMiR may be applied to various scenarios. Other main parameters are shown in Table 1.

TABLE 1

| Parameter Setting | | | |
|---|---|---|---|
| Parameter | Value | Parameter | Value |
| $P_u$ | [0.4, 0.6] W | $\mu^h$ | 0.2 s |
| $D_t(u)$ | [0.5, 1.5] MB | $\mu^h$ | 1 s |
| $C_t(u)$ | [200, 1000] cycles/bit | $\sigma^2$ | $10^{-13}$ W |
| $S_t(u)$ | [0.5, 50] MB | $\alpha$ | $10^{-5}$ |
| $\chi$ | 500 Mpbs | | |

Comparative method. The SeMiR is compared with the following benchmark methods to verify the superiority. It is worth noting that the comparison method allocates the resources to the service instances according to task requirements. To ensure fairness, the scenario settings of all the methods are the same.

Always migrate (AM): service instances are always migrated to the nearest edge nodes along with IVs.

Never migrate (NM): service instances are always located at an initial edge node.

Probable migrate (PM): there is a 20% probability for service instances to be migrated to the adjacent edge node.

Genetic algorithm (GA): the reward is defined as a fitness value, and a heuristic evolutionary algorithm is used to search for an optimal migration individual.

Deep Q-network (DQN): as a value-based DRL, the DQN adopts a centralized training and distributed method to make a migration decision according to the evaluated Q-value.

Deep deterministic policy gradient (DDPG): as an advanced DRL, the DDPG adopts a deterministic policy gradient and one-step-update to optimize a migration policy.

B. Experiment Results and Analysis

Figures 3A, 3B:
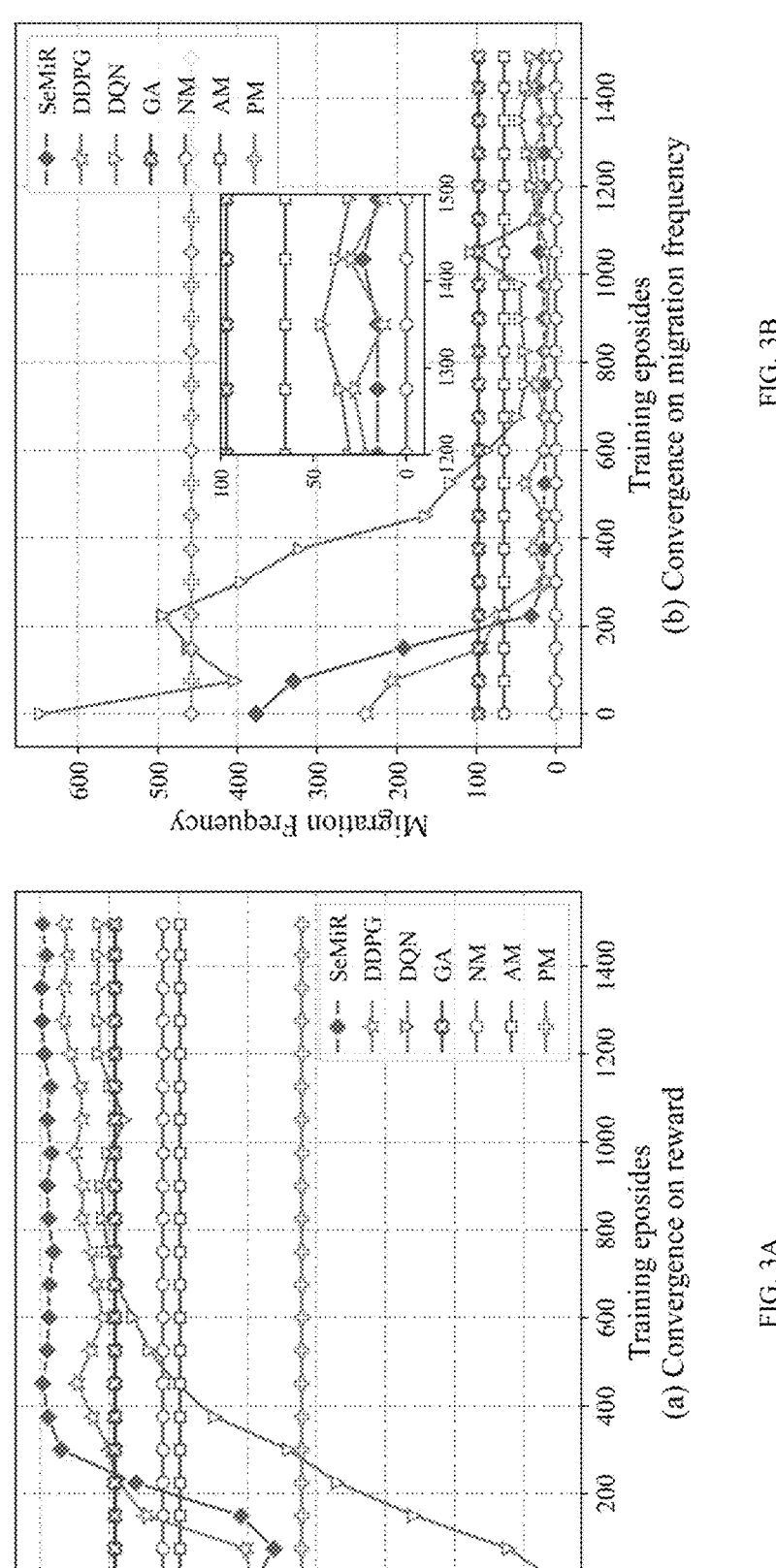
FIGS. 3A and 3B are convergences of different methods in terms of a reward and a migration frequency.

Convergence analysis. The convergences of different methods in terms of a reward and a migration frequency are compared. As shown in FIG. 3A, AM, NM, PM and GA does not involve the training of the neural network, and thus the reward remains unchanged with the increase of training episodes. The PM randomly selects the adjacent edge nodes for migration, causing extra migration delay and transmission delay of the backhaul link. The AM and NM make the migration decision according to a preset rule, having the effect better than the PM. The GA only considers an instant reward without a long-term consideration. In the early stage, the DQN, DDPG and SeMiR do not show superior performance. As the training progresses, the three methods gradually outperform other methods by continuously exploring and learning. The DQN makes a migration decision only according to the local observation but ignores the situations of other IVs, deviating from the global optimum. The DDPG considers the state information of all IVs and thus outperforms the DQN. Compared with the DDPG, the SeMiR combines DRL with convex optimization, thereby achieving more stable process and superior performance. As shown in FIG. 3B, the convergence of different methods on the migration frequency are compared. The frequency frequencies of the PM and NM are the highest and lowest, respectively. In general, IVs tend to stay in a BS communication coverage within consecutive time slots, and thus the migration frequency of the AM is low. The GA always makes the migration decision by searching a randomly-initialized population, resulting in higher migration frequency than the AM. As the training progresses, the DQN, DDPG and SeMiR can learn a better policy, where the SeMiR achieves the best migration frequency by combining asynchronous-update DRL and convex optimization.

Figure 4:
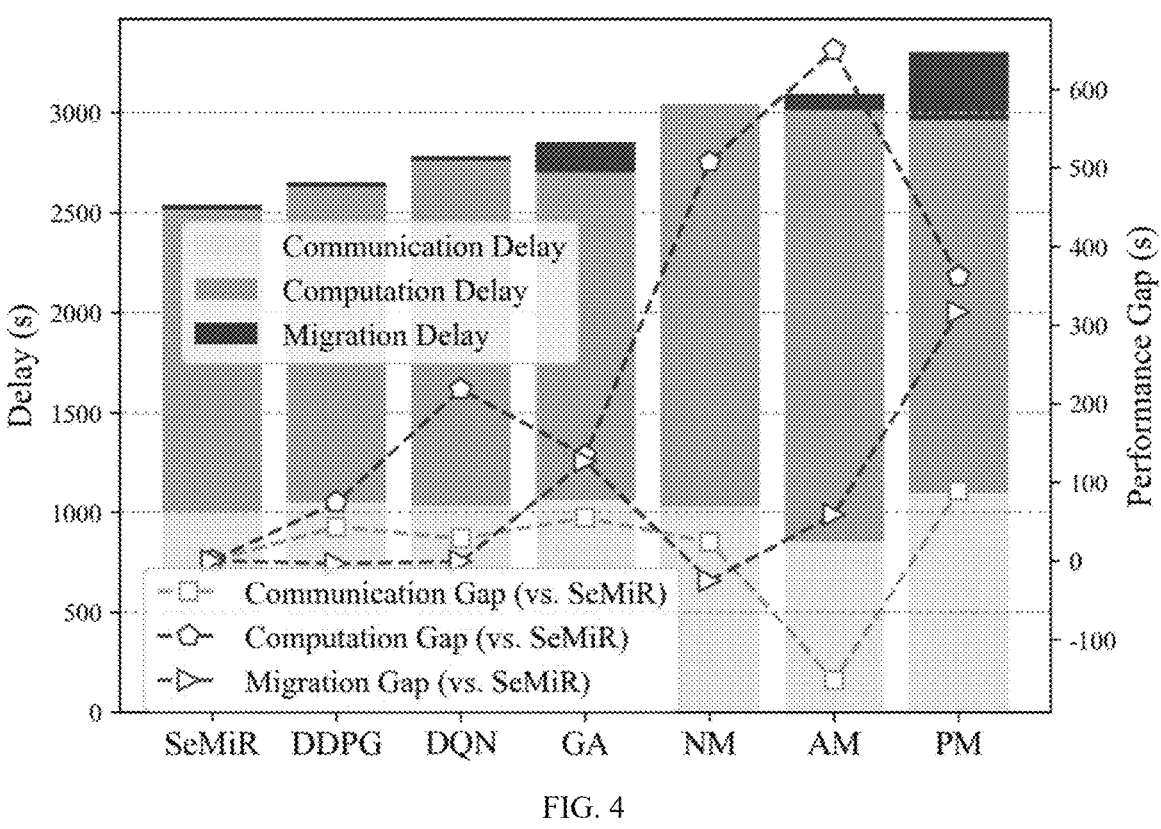
FIG. 4 is a total delay of different methods.

Total delay. As shown in FIG. 4, the total delay (including various delays) of the SeMiR and other methods are compared. Since the NM does not perform the service migration, resulting in no migration delay. However, the NM locates the service instance on the initial node, leading to the overload problem and increasing the computation delay. The AM migrates the service instance along with IV, thereby reducing the communication delay but causing the overload problem. The PM migrates the service instance randomly, thereby prolonging the migration and communication delays. Frequent migrations happen in the GA, but the GA is still superior than the NM, AM and PM under the guidance of prior knowledge. The DQN achieves better performance compared with these methods. However, due to the lack of communication among agents, the global optimum cannot be obtained. By comparison, the DDPG and SeMiR observe the global state and reduces the migration and communication delays, while the SeMiR achieves the optimal resource allocation through convex optimization and exhibits the optimal computation delay.

Figure 5:
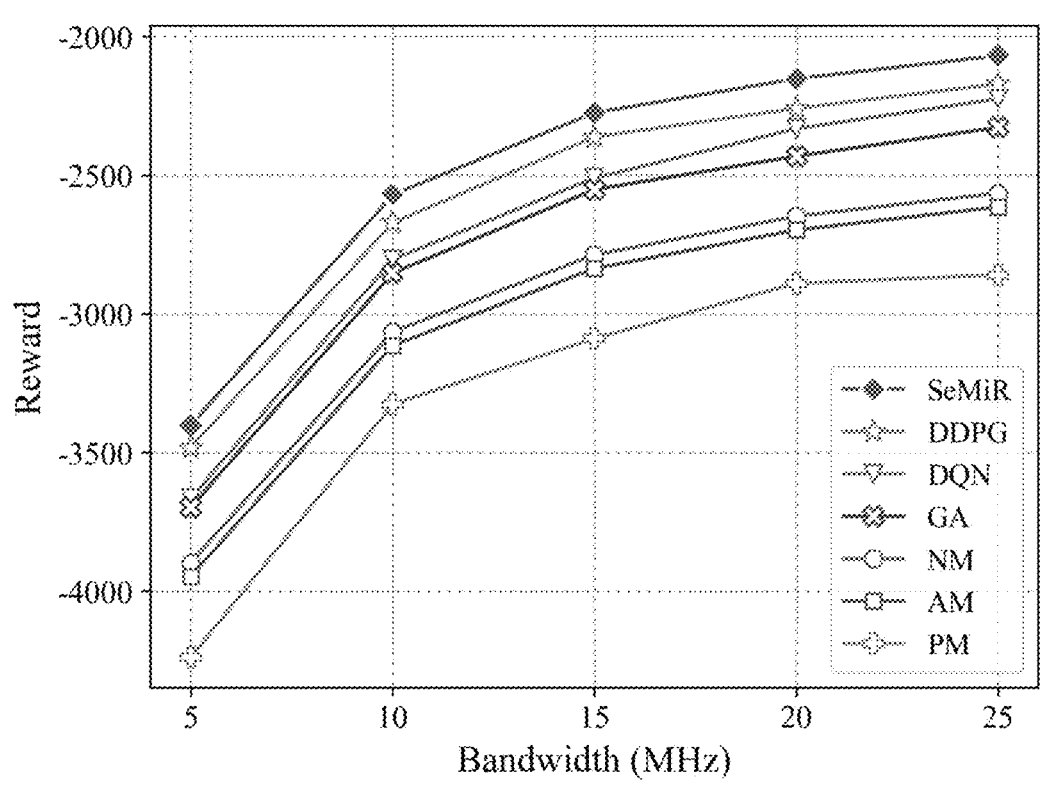
FIG. 5 is a bandwidth reward.

Reward with bandwidth. As shown in FIG. 5, the influences of different bandwidths on different methods are tested. The performance is in an upward trend with the increase of the bandwidth. This is because the growing bandwidths provide IVs with more available bandwidth, which reduces the communication delay accordingly. The PM adopts a random migration with the effect inferior to others. Since the AM and NM perform service migration according to a preset rule, the change of the bandwidth does not affect the migration decision, which limits the improvement of the performance. Compared with the GA, DQN and DDPG, the SeMiR can better fit in the bandwidth change through the adaptive service migration and achieve better performance.

Figure 6:
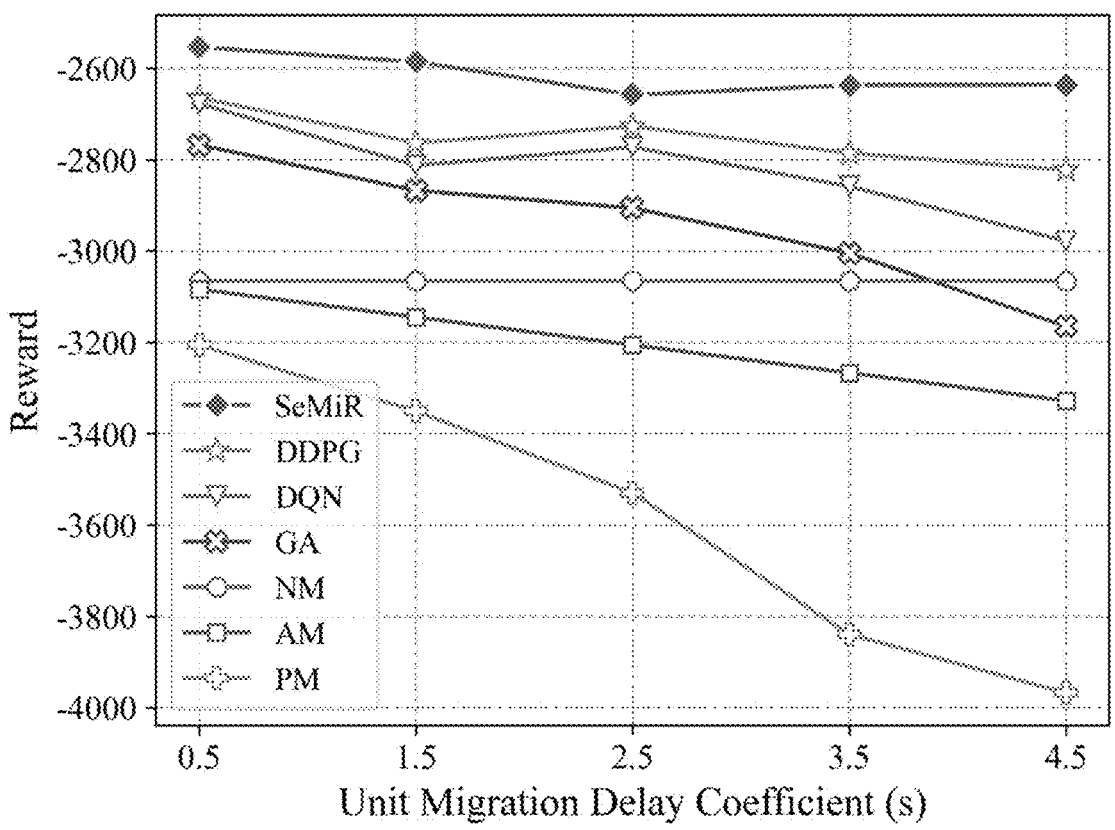
FIG. 6 is a delay coefficient reward.

Reward with delay coefficients. The unit migration delay coefficient is an important factor affecting the service migration performance. As shown in FIG. 6, there is no service migration in NM, and thus the coefficient does not affect the performance. With the increase of the delay coefficient, the performance of other methods exhibits a descending trend. When the value is increased to 4.5, the performance of GA is inferior to that of NM. This is because the GA does not consider long-term rewards. Therefore, even with the guidance of prior knowledge, the GA will prolong the migration delay. By comparison, the SeMiR designs a critic with the one-step-update effect to guide the actor with delayed-update to finally evaluate the Q-value of the migration decision finally. Therefore, the SeMiR can always make a proper migration decision to optimize the long-term system delay and outperform the DQN and DDPG with better stability.

Figure 7:
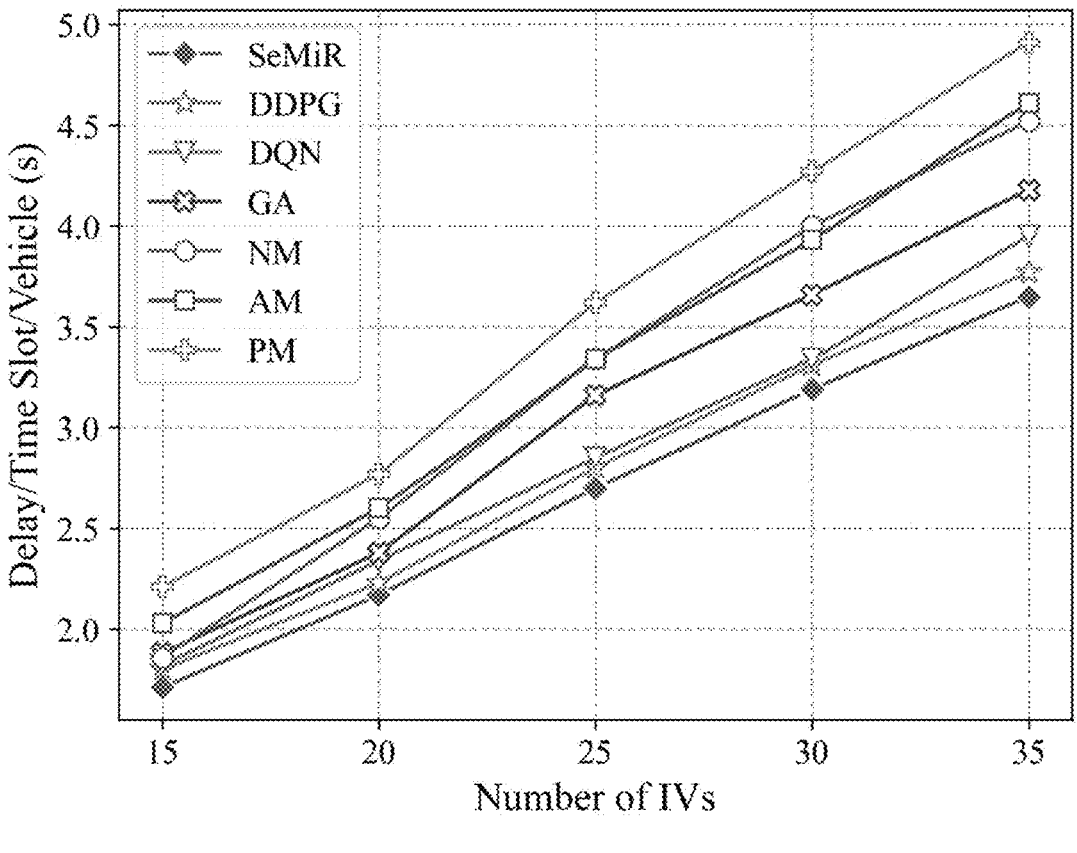
FIG. 7 is an average delay for different IV numbers.

Average delay. As shown in FIG. 7, the average delay of different methods with different numbers of IVs are compared. With the growing number of IVs, the available resources declines, causing an increase of the communication and computation delays accordingly. In a case that the number of IVs is small, edge nodes possess sufficient resources that can be allocated to the service instances, and thus there is no obvious performance gap among different methods. As the number of IVs is increased, it is necessary to rationally migrate the service instances so as to avoid high delay caused by the overload of the MEC server. The DQN allows each agent to make a decision without communicating with other agents, thereby causing the overload problem and local optimum. By comparison, the DDPG and SeMiR determines the interaction among IVs by observing the global state, thereby making a better migration decision. Compared with the DDPG, the SeMiR obtains the optimal resource allocation on the MEC serve by convex optimization, thereby contributing to improving the performance of the service migration.

C. Testbed Validation

Figure 8:
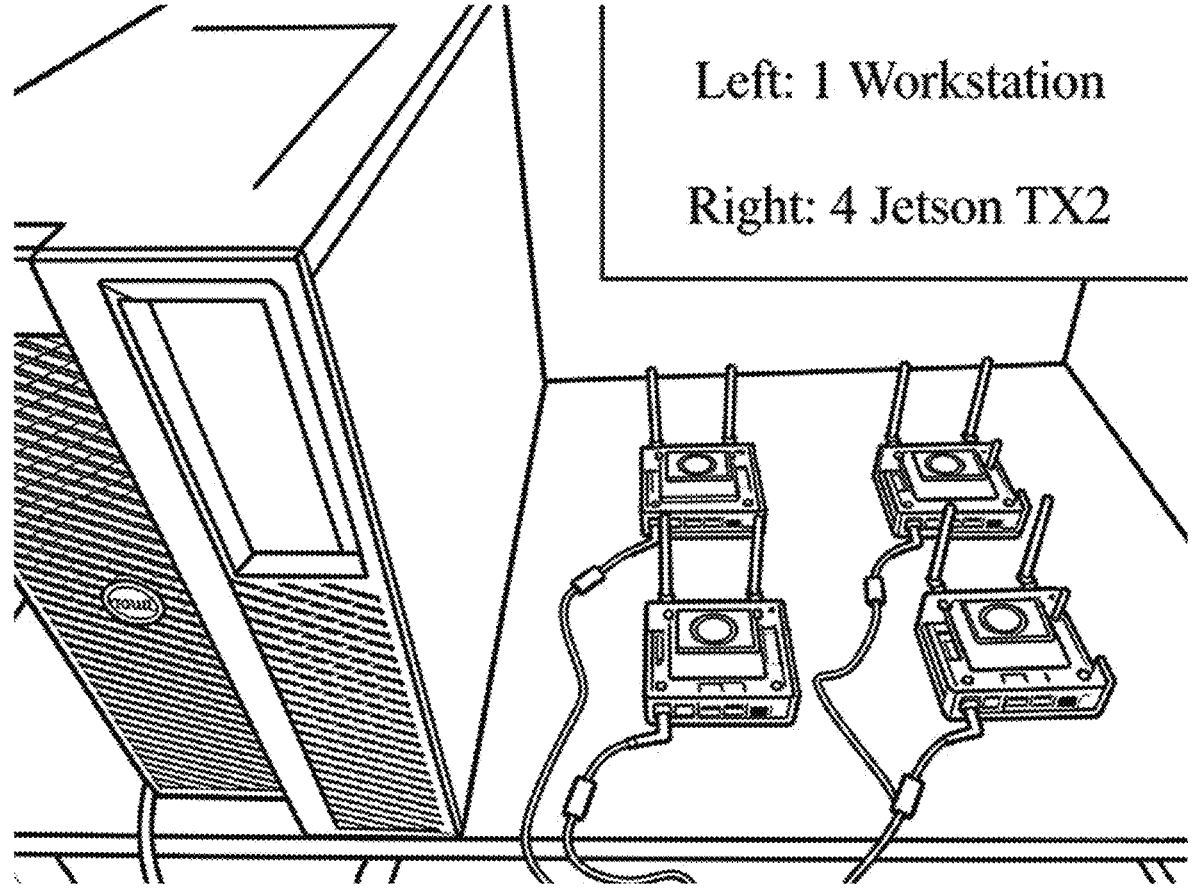
FIG. 8 is a real-world testbed of SeMiR.

Real-world testbed setting. A real-world testbed is built by using hardware devices to further evaluate the SeMiR timely. As shown in FIG. 8, the testbed includes one MEC controller (that is, a workstation) and four edge nodes (that is, Jetson TX2). The workstation is equipped with one 8-core Intel(R) Xeon(R) Silver 4208 CPU and two NVIDIA GeForce RTX 3090 GPUs (24 GB RAM). Each Jetson TX2 is equipped with one 256-core NVIDIA Pascal(R) GPU, one dual-core Denver 2 64-bit CPU and one quad-core Arm(R) Cortex(R)-A57 MPCore processor (8 GB RAM), and the operating system is Ubuntu 18.04.6 LTS. All devices are located in the same local area network (LAN), and a communication platform is constructed according to a Flask framework. The simultaneous access of multiple IVs is simulated through multi-process programming, and in this period, one image recognition application program serves as a test case. IVs generate image recognition tasks with different demands at each time slot. The SeMiR runs on the MEC controller, and the controller makes a migration decision after receiving a task processing request sent by the IVs. After the service migration is completed, an image will be uploaded to a target edge node. In this process, task requests may be forward among edge nodes. Considering the device performance difference in the real test and simulation experiments, binary stream files serve as service instance data transmitted among the edge nodes.

Figure 9:
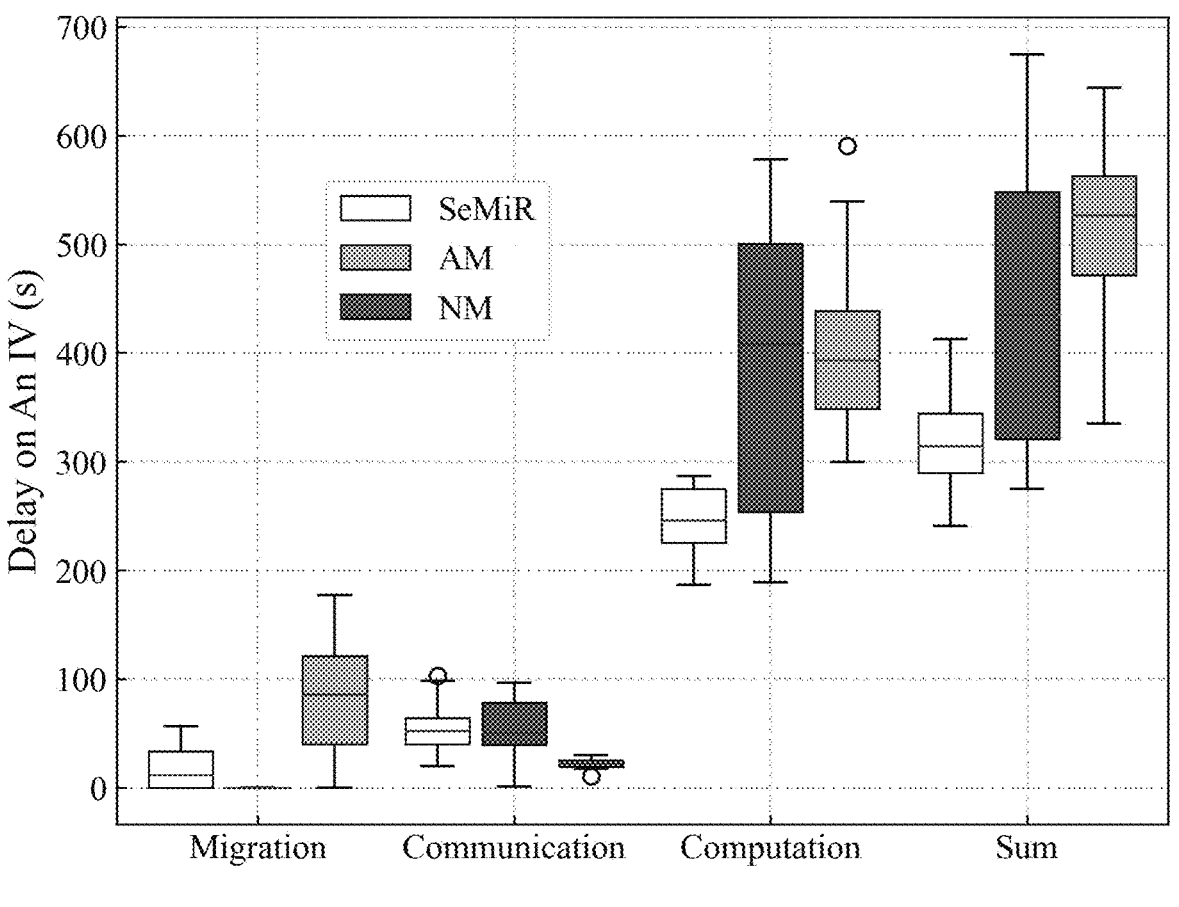
FIG. 9 is a delay of each IV in different methods.

Validation result. As shown in FIG. 9, the delays (including various delays) of IVs by using different methods are compared. In the real test, each edge node has a comparable bandwidth to the simulation experiments, but has a significant disparity in the computational capability. Therefore, irrational service migration will result in much higher delays. The NM always processes tasks at the initial edge node, and thus there is no migration delay. However, the task forwarding between the edge nodes prolongs the communication delay, while the single-node overload results in a substantial computation delay. The NM may maintain high service level for some vehicles, but this capability usually fails to achieve equilibrium across all vehicles. The AM processes tasks at the nearest edge node, so the communication delay is lower than other methods, but the service data migration prolongs the overall delay. By comparison, the SeMiR fully considers the states of IVs within the region and properly conducts service migration, thereby exhibiting the best performance.

In the specification, a novel service migration framework is proposed. The service migration and resource allocation in the dynamic and complex MEC-based IoV system are deemed as a long-term QoS optimization problem, and the problem is decoupled into two sub-problems. For the sub-problem of the service migration, an improved DRL method is designed and adopts delayed and one-step update mechanisms. For the sub-problem of the resource allocation, the optimal resource allocation based on convex optimization is derived theoretically. Extensive experiments are conducted based on a real-world testbed and a dataset of city vehicle trajectories, thereby verifying the effectiveness of the SeMiR. Compared with benchmark methods, the SeMiR achieves better performance under these scenarios with different bandwidths, unit migration delay coefficients and numbers of vehicles. Moreover, the SeMiR achieves faster convergence speed and superior convergence effect than the advanced DQN and DDPG methods. In addition, real-world testbed experiments validate the feasibility and practicability of the SeMiR in reducing the service delay of IVs.

The above described are the preferred embodiments of the present invention. Any changes and functional effects made according to the technical solutions of the present invention without departing from the scope of the technical solutions of the present invention should all belong to the protection scope of the present invention.

What is claimed is:

1. A QoS-aware service migration method in an IoV system based on CVX deep reinforcement learning, comprising: firstly, decoupling an optimization problem of service migration and resource allocation into two sub-problems; then, designing a new actor-critic-based asynchronous-update deep reinforcement learning method to explore the optimal service migration, wherein a delayed-update actor makes decisions of service migration and a one-step-update critic evaluates the decisions to guide a direction of a policy update; and on this basis, proposing an optimal resource allocation method for an MEC server based on convex optimization to achieve the optimal resource allocation.

2. The QoS-aware service migration method in the IoV system based on CVX deep reinforcement learning according to claim 1, wherein the decoupling the optimization problem of service migration and resource allocation into two sub-problems is specifically as follows: for a complex and dynamic MEC-based IoV system, designing a unified service migration and resource allocation model; firstly, setting a long-term QoS as an optimization objective, Qos comprising a migration delay, a communication delay and a computation delay, involving two subproblems of solving a service migration and a resource allocation; and then, respectively decoupling and expressing the two sub-problems of service migration and resource allocation.

3. The QoS-aware service migration method in the IoV system based on CVX deep reinforcement learning according to claim 1, wherein the proposing an optimal resource allocation method for an MEC server based on convex optimization to achieve the optimal resource allocation is as follows: firstly, proving that the resource allocation sub-problem is a convex programming problem through a Hessian matrix with constraint conditions; then, based on the convex optimization theory, defining a generalized Lagrange function and a Karush-Kuhn-Tucker (KKT) condition of the resource allocation sub-problem; and finally, deriving an optimal resource allocation of each MEC server under a given migration decision.

4. The QoS-aware service migration method in the IoV system based on CVX deep reinforcement learning according to claim 1, wherein the decoupling the optimization problem of service migration and resource allocation into two sub-problems is implemented specifically as follows:

the MEC-based service migration system is composed of an MEC controller, M base stations (BS) and U intelligent vehicles (IV); each BS is equipped with an MEC server, named edge node; a set of edge nodes is expressed as M={1, 2, . . . , m, . . . , M}, and a set of IVs is expressed as U={1, 2, . . . , u, . . . , U}; $IV_u$ sends a task to a service instance corresponding thereto in a 5G network, and the BS forwards the task to the MEC server where the service instance is located; the MEC server processes the task and returns the result; the MEC controller gathers and transmits information to a DRL agent, and the DRL agent generates decisions of service migration for the IVs;

the system runs in discrete time slots, and locations of $IV_u$ change at the beginning of each time slot t, t∈{0, 1, 2, . . . , T}; meanwhile, an intelligent application on $IV_u$ generates a computation-intensive task at each time slot, denoted as $Task_t$ (u), and these tasks are continuously offloaded to the MEC server for processing; at the first time slot, $IV_u$ accesses the system through the nearest BS and creates a service instance on the corresponding MEC server; at the time slot t, an edge node connected to $IV_u$ is denoted as $$M_t^i(u) \in \mathcal{M},$$

and an edge node where the service instance of $IV_u$ is located is denoted as $$M_t^s(u) \in \mathcal{M};$$

the edge nodes are interconnected through stable backhaul links; in a case that $IV_u$ is disconnected from $$M_t^s(u),$$

the task thereon is still transmitted to $$M_t^s(u)$$

by the backhaul link;

A. Migration Model $$M_{t-1}^s(u) \in \mathcal{M}$$

is defined as an edge node where the service instance of $IV_u$ is located at the time slot t−1, ρt(u)∈M is defined as a migration decision of $IV_u$ at the time slot t, $$M_t^s(u)$$

being determined by ρt(u); in addition, a hop distance between $$M_{t-1}^s(u)$$

and $$M_t^s(u)$$

is measured by $\delta_t(u)$; in a case that $$M_{t-1}^s(u) = M_t^s(u), \delta_t(u) = 0,$$

no service migration happens at the current time slot; otherwise, the service instance of $IV_u$ is migrated from $$M_{t-1}^s(u) \text{ to } M_t^s(u),$$

and in this period, a migration delay occurs, the migration delay being a monotonic non-decreasing function of $\delta_t(u)$ and expressed as $$MT_t(u) = \begin{cases} 0, & \delta_t(u) = 0 \\ \dfrac{S_t(u)}{\chi} + \mu^m \delta_t(u), & \delta_t(u) \neq 0 \end{cases}$$

wherein $S_t(u)$ is service data of $IV_u$, x is a network bandwidth of the backhaul link, and $\mu^m$ is a unit migration delay coefficient that indicates the migration delay per hop;

B. Communication Model after service migration, $IV_u$ offloads $Task_t(u)$ to a service instance on $$M_t^s(u)$$

for processing, and in this period, a communication delay is generated and comprises a data transmission delay between $IV_u$ and $$M_t^i(u)$$

and a transmission delay of the backhaul link between $$M_t^i(u) \text{ and } M_t^s(u);$$

a signal-to-noise ratio (SNR) between $IV_u$ and $$M_t^i(u)$$

is expressed as:

$$SNR\left(u, M_t^i(u)\right) = \frac{P_u \, G\left(u, M_t^i(u)\right)}{\sigma^2}$$

wherein $P_u$ is a transmission power of $IV_u$, $\sigma^2$ is Gaussian noise, $$G\left(u, M_t^i(u)\right)$$

is a channel gain between $IV_u$ and $$M_t^i(u)$$

and is expressed as $$G\left(u, M_t^i(u)\right) = \frac{\alpha}{\left|Len\left(u, M_t^i(u)\right)\right|^2}$$

wherein $$Len\left(u, M_t^i(u)\right)$$

is a distance between $IV_u$ and $$M_t^i(u),$$

and $\alpha$ is a channel gain per unit distance;

a total bandwidth of the BS is denoted as B, B is equally allocated to vehicles at each time slot based on orthogonal frequency division multiplexing (OFDM), and a wireless uplink rate of $IV_u$ is defined as $$R_t(u) = B_t(u) \log \left(1 + SNR\left(u, M_t^i(u)\right)\right).$$

wherein $B_t$ is an available bandwidth of $IV_u$;
then, the data transmission delay of $IV_u$ is defined as $$PT_t(u) = \frac{D_t(u)}{R_t(u)}$$

wherein $D_t(u)$ is a data volume of Task$_t$(u);
in a case that $$M_t^i(u) \neq M_t^s(u),$$

Task$_t$(u) will be transmitted on the backhaul link; the transmission delay of the backhaul link depends on $D_t(u)$ and a hop distance between $$M_t^i(u) \text{ and } M_t^s(u);$$

the hop distance is measured by $$\phi_t^{ls}(u),$$

and the transmission delay of the backhaul link is expressed as $$ST_t(u) = \begin{cases} 0, & \phi_t^{ls}(u) = 0 \\ \frac{D_t(u)}{\chi} + \mu^h \phi_t^{ls}(u), & \phi_t^{ls}(u) \neq 0 \end{cases}$$

wherein $\mu^h$ is a unit transmission delay coefficient that indicates a transmission delay per hop;
therefore, the communication delay is expressed as $$HT_t(u) = PT_t(u) + ST_t(u).$$

C. Computation Model
when Task$_t$(u) is offloaded to $$M_t^s(u),$$

the MEC server will allocate a computational resource to the service instance to process the task; a CPU cycle required to process Task$_t$(u) is defined as $$K_t(u) = D_t(u)C_t(u)$$

wherein $C_t(u)$ is a computational density of Task$_t$(u) and indicates the CPU cycles for processing one-bit task data;
the maximum computational capability of the MEC server, that is, a CPU frequency, is denoted as F; therefore, the computation delay is expressed as:

$$CT_t(u) = \frac{K_t(u)}{\xi_t(u)F}$$

wherein $\xi_t(u)$ indicates the proportion of the computational resource allocated to the service instance of $IV_u$;
D. Optimization Objective
within T time slots, the objective is to minimize the long-term delay of the MEC-based IoV system, comprising a migration delay, a communication delay and a computation delay, that is, to solve the optimization problem of service migration and resource allocation:

$$P1: \min_{\rho_t(u), \xi_t(u)} \sum_{t=0}^{T} \sum_{u=1}^{U} (MT_t(u) + HT_t(u) + CT_t(u))$$

$$\text{s.t.} \quad \begin{array}{l} C1: \rho_t(u) \in \mathcal{M}, t \in T, u \in \mathcal{U}, \\ C2: \xi_t(u) \in [0, 1], t \in T, u \in \mathcal{U}, \\ C3: \sum_{u \in \mathcal{U}_m} \xi_t(u) \leq 1, t \in T, m \in \mathcal{M}, \end{array}$$

wherein IVs that migrate the service instances to the edge node m are expressed as a set $U_m$, C1 indicates a constraint of a migration decision, C2 indicates a constraint of a resource proportion allocated to the service instance, and C3 indicates a constraint of a proportion sum of C2;
a total computational resource of the MEC server is denoted as $F_{ALL}$, and a total delay is defined as $AT_t(u)$, wherein $AT_t(u) = -(MT_t(u) + HT_t(u) + CT_t(u))$; therefore, the optimization problem of service migration and resource allocation is described as $$\max \sum_{u=1}^{U} AT_t(u) \text{s.t.} \sum_{u=1}^{U} \xi_t(u)F \leq F_{ALL}$$

considering different decision types of service migration and resource allocation, the service migration and the resource allocation belong to two dimensions of P1, so P1 is decoupled into the following two sub-problems:
P2: the long-term delay of the system is minimized by optimizing the service migration, and this sub-problem is described as $$\min_{\rho_t(u)} \sum_{t=0}^{T} \sum_{u=1}^{U} (MT_t(u) + HT_t(u) + CT_t(u)) \text{s.t.} \quad C1$$

31

P3: the computation delay of the edge node m is minimized by optimizing the resource allocation after the service migration, and this sub-problem is described as $$\min_{\xi_t(u)} \sum_{u \in \mathcal{U}_m} \frac{K_t(u)}{\xi_t(u)F} \text{s.t. } C2 - C3.$$

5. The QoS-aware service migration method in the IoV system based on CVX deep reinforcement learning according to claim 4, wherein the designing a new actor-critic-based asynchronous-update deep reinforcement learning method to explore the optimal service migration is implemented specifically as follows:

service migration in the MEC-based IoV system is a sequential decision problem that is modeled as a Markov decision process); in DRL, a 5-tuple $\mathcal{S}$, $\mathcal{A}$, $\mathcal{P}$, $\mathcal{R}$, $\gamma$) is used to process MDP, wherein $\mathcal{S}$, $\mathcal{A}$, $\mathcal{P}$, $\mathcal{R}$ and $\gamma$ are a state space, an action space, a state transition, a reward function ad a discount factor, respectively; a policy $\pi(\bullet|s_t)$ indicates an action distribution at a state $s_t$; a policy $\pi$ is given, the DRL agent firstly chooses and executes an action $a_t$ at the state $s_t$; then, an environment feeds back an instant reward $r_t$ and enters a next state $s_{t+1}$; through this interaction process, the DRL agent will obtain a trajectory $\tau=(s_t, a_t, r_t, s_{t+1}, a_{t+1}, r_{t+1}, \ldots, s_T, a_T, r_T)$ under the guidance of the policy $\pi$; a discounted cumulative reward of the trajectory $\tau$ is computed as $$G_t(\tau) = r_t + \gamma r_{t+1} + \gamma^2 r_{t+2} + \ldots + \gamma^{T-t} r_T = \sum_{i=t}^{T} \gamma^{i-t} r_i$$

guided by a policy, multiple trajectories may be generated, $G_t(\tau)$ follows a random distribution, an expected reward is used to evaluate the value of taking $a_t$ at $s_t$, and a state-action value function is expressed as $$Q_\pi(s_t, a_t) = \mathbb{E}_\pi[G_t \mid S = s_t, A = a_t]$$
$$= r_t + \gamma \mathbb{E}_\pi[Q_\pi(s_{t+1}, a_{t+1}) \mid S = s_t, A = a_t]$$

the objective of DRL is to learn an optimal policy $\pi^*$ for maximizing the discounted cumulative rewards at any initial state; the optimal action at each state is evaluated by the optimal state-action value function, expressed as $$Q^*(s_t, a_t) = \max_\pi Q_\pi(s_t, a_t)$$

a new actor-critic-based asynchronous-update deep reinforcement learning (DRL) method is proposed to explore the optimal service migration in the MEC-based dynamic IoV system; in the optimization process of the service migration, the DRL agent selects $a_t$ at $s_t$ according to $\pi$ and the environment feeds back $r_t$ which is transmitted to $s_{t+1}$; this process is expressed as a Markov decision process (MDP); specifically, the state space, the action space and the reward function are defined as follows:

state space: the state at the time slot t comprises information of IVs, that is, the location of the IV, the data volume of the tasks, the computational density of the tasks and service data, and information of the edge node where the service instance is located at the time slot t−1; therefore, the state is defined as $$s_t = [Loc_t(u), D_t(u), C_t(u), S_t(u), M_{t-1}^s(u)]_{u \in \mathcal{U}}$$

action space: at the time slot t, the DRL agent executes a service migration action $a_t$ corresponding to $s_t$, and the service instance of $IV_u$ is capable of being migrated to any edge node; therefore, the action is defined as $$a_t = [\rho_t(u)]_{u \in \mathcal{U}}$$

wherein $\rho_t(u) \in \mathcal{M}$ is a migration decision of $IV_u$;
reward function: the reward is negatively correlated with a long-term system delay, expressed as $$r_t = -\sum_{u=1}^{U} (MT_t(u) + HT_t(u) + CT_t(u))$$

to optimize P2, an actor-critic architecture and a deep deterministic policy gradient are adopted to train and optimize service migration policies in a complex and dynamic MEC-based IoV system, that is, the actor generates actions of the service migration, while the critic evaluates the Q-values of the actions, specifically as follows:

firstly, the actor $\mu$, the critic $\psi$, the target actor $\hat{\mu}$ the target critic $\hat{\psi}$, a replay memory X, the number of training episodes E and the maximum time slot T per episode are initialized; on each training episode, the IVs creates service instances on the nearest edge node; at the time slot t, $s_t$ is input into the actor $\mu$, which generates and executes an action of service migration $a_t$; then, the optimal resource allocation of the service instances on each edge node is obtained through convex optimization; then $r_t$ is calculated, and the state is switched to $s_{t+1}$; a sample $(s_t, a_t, r_t, s_{t+1})$ is stored into X, and N samples are drawn randomly from X to train network parameters; then, the cumulative expected discount reward is calculated, and the loss of the critic is minimized by an Adam optimizer, so that the updated critic is capable of better fitting in $Q^*(s_t, a_t)$; then, a delayed-update mechanism is designed to solve the problem of the fluctuating update of the actor, and the actor is updated only after the critic has been updated $\lambda$ times; since optimization objective of the actor is $J(\theta_\mu) = (\mathbb{E}_{\theta_\mu}[\psi(s_t, \mu(s_t|\theta_\mu)|(\theta_\psi)]$ the actor is updated by adjusting the parameter $\theta_\mu$, so that the output $\mu(s_t|\theta_\mu)$ is capable of being updated in an upward direction according to $\psi(s_t, \mu(s_t|\theta_\mu)|\theta_\psi)$ calculated by the critic; and specifically, the gradient ascent is used to update the actor, and the network parameters of the target actor and the target critic are implemented through soft update.

6. The QoS-aware service migration method in the IoV system based on CVX deep reinforcement learning according to claim 5, wherein the proposing an optimal resource allocation method for an MEC server based on convex optimization to achieve the optimal resource allocation is implemented specifically as follows:

an index of $U_m$, is reassigned into $\mathcal{Z}=\{1, 2, \ldots z, \ldots, Z\}$, and C2 is rewritten correspondingly, so the following formula $$\min_{\xi_t(u)} \sum_{u \in \mathcal{U}_m} \frac{K_t(u)}{\xi_t(u)F} \text{s.t. } C2 - C3$$

is redefined as $$Y[\xi_t(1), \xi_t(2), \ldots, \xi_t(Z)] = \min_{\xi_t(z)} \sum_{z=1}^{Z} \frac{K_t(z)}{\xi_t(z)F}$$

$$\text{s.t. } C3: \sum_{z=1}^{Z} \xi_t(z) - 1 \le 0, t \in T, z \in \mathcal{Z},$$

$$C4: -\xi_t(z) \le 0, t \in T, z \in \mathcal{Z},$$

$$C5: \xi_t(z) - 1 \le 0, t \in T, z \in \mathcal{Z},$$

wherein C2 is converted into C4 and C5, indicating an upper limit and a lower limit of the allocated resource proportion;

the Hessian matrix is a square matrix that is formed by a second-order partial derivative of a multivariate function; the Hessian matrix of the above formula is defined as $$H = \begin{bmatrix} \frac{\partial^2 Y}{\partial [\xi_t(1)]^2} & \frac{\partial^2 Y}{\partial \xi_t(1)\partial \xi_t(2)} & \cdots & \frac{\partial^2 Y}{\partial \xi_t(1)\partial \xi_t(Z)} \\ \frac{\partial^2 Y}{\partial \xi_t(2)\partial \xi_t(1)} & \frac{\partial^2 Y}{\partial [\xi_t(2)]^2} & \cdots & \frac{\partial^2 Y}{\partial \xi_t(2)\partial \xi_t(Z)} \\ \vdots & \vdots & \ddots & \vdots \\ \frac{\partial^2 Y}{\partial \xi_t(Z)\partial \xi_t(1)} & \frac{\partial^2 Y}{\partial \xi_t(Z)\partial \xi_t(2)} & \cdots & \frac{\partial^2 Y}{\partial [\xi_t(Z)]^2} \end{bmatrix}$$

wherein $$\frac{\partial^2 Y}{\partial \xi_t(i)\partial \xi_t(j)} = \begin{cases} 0, & i \ne j \\ \frac{2K_t(i)}{[\xi_t(i)]^3 F}, & i = j \end{cases}$$

$$\forall i, j \in \mathcal{Z}, K_t(\cdot) \ge 0 \text{ and } \xi_t(\cdot) \ge 0$$

F is a non-zero real number; moreover, the values on the diagonal of the Hessian matrix are all positive, so the Hessian matrix is a symmetric positive definite matrix, so P3 is a convex programming problem;

according to the optimality theorem of the convex programming, any feasible KKT point is a global optimal point; in addition, the generalized Lagrange function is defined as $$L = \sum_{z=1}^{Z} \frac{K_t(z)}{\xi_t(z)F} + \beta \left( \sum_{z=1}^{Z} \xi_t(z) - 1 \right) + \sum_{z=1}^{Z} \eta_z(-\xi_t(z)) + \sum_{z=1}^{Z} \zeta_z(\xi_t(z) - 1),$$

wherein $\forall \beta, \eta_z, \zeta_z, z \in \mathcal{Z}$ are Lagrange multipliers corresponding to C3, C4 and C5, respectively; therefore, $$Y[\xi_t(1), \xi_t(2), \ldots, \xi_t(Z)] = \min_{\xi_t(z)} \sum_{z=1}^{Z} \frac{K_t(z)}{\xi_t(z)F}$$

$$\text{s.t. } C3: \sum_{z=1}^{Z} \xi_t(z) - 1 \le 0, t \in T, z \in \mathcal{Z},$$

$$C4: -\xi_t(z) \le 0, t \in T, z \in \mathcal{Z},$$

$$C5: \xi_t(z) - 1 \le 0, t \in T, z \in \mathcal{Z},$$

the KKT conditions of the redefined P3 in the following formula are described as $$\begin{cases} -\frac{K_t(z)}{[\xi_t(z)]^2 F} + \beta - \eta_z + \varsigma_z = 0, t \in T, z \in Z, \\ \beta \left( \sum_{z=1}^{Z} \xi_t(z) - 1 \right) = 0, \sum_{z=1}^{Z} \xi_t(z) - 1 \le 0, t \in T, z \in Z, \\ \eta_z(-\xi_t(z)) = 0, -\xi_t(z) \le 0, t \in T, z \in Z, \\ \varsigma_z(\xi_t(z) - 1) = 0, \xi_t(z) - 1 \le 0, t \in T, z \in Z, \\ \beta \ge 0, \eta_z \ge 0, \varsigma_z \ge 0, t \in T, z \in Z.. \end{cases}$$

according to the above KKT conditions, the optimal resource allocation is derived by the following formula:

$$\xi_t(z) = \frac{\sqrt{K_t(z)}}{\sum_{z=1}^{Z} \sqrt{K_t(z)}}, t \in T, z \in \mathcal{Z}$$

each MEC server is capable of obtaining the optimal resource allocation for the service instances.

\* \* \* \* \*